United States Patent
Kim et al.

(10) Patent No.: US 7,373,148 B2
(45) Date of Patent: May 13, 2008

(54) METHOD FOR CELL RESELECTION IN AN MBMS MOBILE COMMUNICATION SYSTEM

(75) Inventors: Soeng-Hun Kim, Suwon-si (KR); Kook-Heui Lee, Yongin-si (KR); Kyeong-In Jeong, Suwon-si (KR); Sung-Oh Hwang, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 763 days.

(21) Appl. No.: 10/821,005

(22) Filed: Apr. 8, 2004

(65) Prior Publication Data

US 2004/0202140 A1 Oct. 14, 2004

(30) Foreign Application Priority Data

Apr. 9, 2003 (KR) ............... 10-2003-0022317
Apr. 15, 2003 (KR) ............... 10-2003-0023739

(51) Int. Cl.
*H04Q 7/20* (2006.01)
(52) U.S. Cl. .............. 455/437; 437/442; 370/331
(58) Field of Classification Search ........... 455/436, 455/437, 438–444; 370/312, 331, 335, 336
See application file for complete search history.

(56) References Cited

U.S. PATENT DOCUMENTS

| | | | | |
|---|---|---|---|---|
| 5,887,252 A | * | 3/1999 | Noneman | 455/463 |
| 6,256,300 B1 | * | 7/2001 | Ahmed et al. | 370/331 |
| 6,731,936 B2 | * | 5/2004 | Chen et al. | 455/437 |
| 6,977,914 B2 | * | 12/2005 | Paila et al. | 370/331 |
| 6,980,820 B2 | * | 12/2005 | Sinnarajah et al. | 455/515 |
| 6,993,000 B2 | * | 1/2006 | Famolari | 370/332 |
| 7,061,880 B2 | * | 6/2006 | Basilier | 370/312 |
| 7,082,116 B2 | * | 7/2006 | Reza et al. | 370/338 |
| 2003/0032462 A1 | | 2/2003 | Wang et al. | |

FOREIGN PATENT DOCUMENTS

WO  WO 03/017713  2/2003

OTHER PUBLICATIONS

LG Information & Communications, Ltd., Definitions and Characteristics of Multicast Channels, TSG-RAN Working Group 2, Mar. 8, 1999.
Universal Mobile Telecommunications System (UMTS); Multimedia Broadcast/Multicast Service (MBMS); ETSI Standards, Mar. 2002.

* cited by examiner

*Primary Examiner*—Blane J. Jackson
(74) *Attorney, Agent, or Firm*—The Farrell Law Firm, PC

(57) ABSTRACT

A cell reselection method by a user equipment (UE) receiving an MBMS service in a serving cell of a mobile communication system. The UE receives control data of the serving cell, including configuration information necessary for accessing MBMS control channels (MCCHs) of neighbor cells and control information necessary for accessing an MBMS data transport channel (MTCH) of the serving cell, over an MCCH of the serving cell, and stores the received control data, while the MBMS service is provided in the serving cell. If cell reselection to a target cell, which is one of the neighbor cells is determined, the UE moves to the target cell by utilizing configuration information stored for the target cell.

29 Claims, 17 Drawing Sheets

METHOD FOR CELL RESELECTION IN AN MBMS MOBILE COMMUNICATION SYSTEM

PRIORITY

This application claims priority under 35 U.S.C. § 119 to an application entitled "Method for Achieving Cell Reselection by User Equipment in an MBMS Mobile Communication System" filed in the Korean Intellectual Property Office on Apr. 9, 2003 and assigned Serial No. 2003-22317, and an application entitled "Method for Achieving Cell Reselection by User Equipment in an MBMS Mobile Communication System" filed in the Korean Intellectual Property Office on Apr. 15, 2003 and assigned Serial No. 2003-23739, the contents of both of which are incorporated herein by reference.

BACKGROUND OF THE INVENTION

1. Field of the Invention

The present invention relates generally to mobility support in a mobile communication system, and in particular, to a method of cell selection in a user equipment (UE) supporting Multimedia Broadcast/Multicast Service (MBMS).

2. Description of the Related Art

Currently, as a result of the development of communication technology, services provided in a Code Division Multiple Access (CDMA) mobile communication system are developing into Multicasting/Multimedia Communication services for transmitting the existing voice service data and additional large amounts of data such as packet data and circuit data.

In a Universal Mobile Telecommunication Service (UMTS) system, which is a $3^{rd}$ generation (3G) mobile communication system employing Wideband Code Division Multiple Access (WCDMA) based on Global System for Mobile communications (GSM) and General Packet Radio Services (GPRS), Broadcast/Multicast Service in which the same data stream is provided from one data source to a plurality of user equipments (UEs) is supported in order to support the Multicasting/Multimedia Communication. The Broadcast/Multicast Service can be classified into Cell Broadcast Service (CBS), which is a message-oriented service, and Multimedia Broadcast/Multicast Service (MBMS service) for supporting multimedia data including real-time images and voice, still images, and text.

FIG. 1 is a diagram schematically illustrating a network configuration for providing an MBMS service in a mobile communication system. Referring to FIG. 1, a multicast/broadcast-service center (MB-SC) 110 provides an MBMS stream, and the MS-SC 110 schedules an MBMS service stream and sends the scheduled MBMS service stream to a transit network (NW) 120. The transit network 120 is a network existing between the MB-SC 110 and a serving GPRS support node (SGSN) 130, which sends the MBMS service stream provided from the MB-SC 110 to the SGSN 130. The transit network 120 is comprised of a gateway GPRS support node (GGSN) and an external network.

The SGSN 130 receiving an MBMS service stream via the transit network 120 controls an MBMS service for the subscribers, i.e., UEs 161, 162, 163, 171, and 172, requesting the MBMS service. For example, the SGSN 130 manages MBMS service accounting data for each of the subscribers, and selectively transmits MBMS service data to an associated radio network controller (RNC) 140. In addition, the SGSN 130 generates and manages a service context for the MBMS service and sends a stream for the MBMS service to the RNC 140.

The RNC 140 transmits the MBMS service stream to Node Bs 160 and 170 controlling the cells where the UEs 161, 162, 163, 171, and 172 requesting an MBMS service are located, among the Node Bs managed by the RNC 140 itself The RNC 140 and the Node Bs 160 and 170 constitute a UMTS terrestrial radio access network (UTRAN).

A cell 1, which belongs to the Node B 160 that is requesting a particular MBMS service, includes the UE1 161, the UE2 162, and the UE3 163, and a cell 2, which belongs to the Node B 170, includes the UE4 171 and the UE5 172. Herein, the term "cell" has a meaning similar to that of the term "Node B." The RNC 140 controls radio channels set up between the Node Bs 160 and 170 and the UEs 161, 162, 163, 171, and 172 in order to provide the MBMS service. As illustrated in FIG. 1, one radio channel is established between one Node B and UEs belonging to the Node B in order to provide an MBMS service.

In such an MBMS service system, when a UE receiving an MBMS service moves from one cell, i.e., a serving cell, to another cell, i.e., a target cell, the control of the UE must be handed over from the serving cell to the target cell by a cell reselection procedure. More specifically, the UE must acquire information on the target cell in order to continuously use the same MBMS service as that used in the serving cell. The target cell information includes control information for accessing a transport channel for carrying a data stream for an MBMS service in the target cell. As a result, during cell reselection, delay occurs when acquiring information on the target cell by the UE. Further, this delay prevents the user from seamlessly receiving the MBMS service while moving between cells. Accordingly, there is a demand for cell reselection technology that enables a UE to rapidly acquire information on a target cell while moving between cells, thereby seamlessly providing an MBMS service.

SUMMARY OF THE INVENTION

It is, therefore, an object of the present invention to provide a method for seamlessly receiving an MBMS service while a UE moves between cells.

It is another object of the present invention to provide a method for providing an efficient service by supporting mobility of a UE receiving an MBMS service.

It is further another object of the present invention to provide a method for efficiently maintaining call mobility of a UE by previously storing MBMS control information needed by the UE to receive MBMS data from neighbor cells.

According to a first aspect of the present invention, in a mobile communication system including a plurality of cells and providing a Multimedia Broadcast/Multicast Service (MBMS) service, there is provided a cell reselection method by a user equipment (UE) receiving the MBMS service in a serving cell, which is one of the plurality of cells. The method comprises the steps of: receiving control data of the serving cell, including configuration information necessary for accessing MBMS control channels (MCCHs) of neighbor cells and control information necessary for accessing an MBMS data transport channel (MTCH) of the serving cell, over an MCCH of the serving cell, and storing the received control data, while the MBMS service is provided in the serving cell, and if cell reselection to a target cell, which is one of the neighbor cells is determined, moving to the target cell by consulting configuration information stored for the target cell.

According to a second aspect of the present invention, in a mobile communication system including a plurality of cells and providing a Multimedia Broadcast/Multicast Service (MBMS) service, there is provided a method for providing an MBMS service to a user equipment (UE) moving between the cells. The method comprises the steps of: transmitting system information including information on a secondary common control channel for an MBMS service of a serving cell over a primary common control channel of the serving cell; and transmitting control data including configuration information necessary for accessing MBMS control channels (MCCHs) of neighbor cells and control information necessary for accessing an MBMS data transport channel (MTCH) of the serving cell over the secondary common control channel of the serving cell, while providing an MBMS service over the MTCH of the serving cell.

According to a third aspect of the present invention, in a mobile communication system including a plurality of cells and providing a Multimedia Broadcast/Multicast Service (MBMS) service, there is provided a cell reselection method by a user equipment (UE) receiving the MBMS service in a serving cell, which is one of the plurality of cells. The method comprises the steps of: if candidate cells for cell reselection is detected while an MBMS service is provided in a serving cell, receiving first system information of the candidate cells including scheduling information necessary for accessing MBMS control channels (MCCHs) of the candidate cells, and second system information of the candidate cells related to a code channel to which MCCHs of the candidate channels are mapped; receiving control information necessary for accessing MBMS data transport channels (MTCHs) of the candidate cells over MCCHs of the candidate channels, using the first and second system information, and storing the received control information; and if cell reselection to a target cell, which is one of the candidate cells, is determined, moving to the target cell by consulting control information stored for the target cell.

According to a fourth aspect of the present invention, in a mobile communication system including a plurality of cells and providing a Multimedia Broadcast/Multicast Service (MBMS) service, there is provided a method for providing the MBMS service to user equipments (UEs) moving between the plurality of cells. The method comprises the steps of: transmitting, in a cell proving an MBMS service, first system information including scheduling information necessary for accessing an MBMS control channel (MCCH) of the cell and second system information related to a code channel to which an MCCH of the cell is mapped; and transmitting control information necessary for accessing an MBMS data transport channel (MTCH) of the cell over an MCCH of the cell.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

Several preferred embodiments of the present invention will now be described in detail herein below with reference to the annexed drawings. In the following description, a detailed description of known functions and configurations incorporated herein has been omitted for conciseness.

In the present invention, a UE receiving an MBMS service previously stores MBMS service-related information of neighbor cells to which it can move, thereby preventing call delay at cell reselection. In the specification, the term "MBMS service-related information" refers to information necessary for receiving the MBMS service in neighbor cells, and includes information related to a traffic channel and a control channel for the MBMS service.

However, before a description of preferred embodiments of the present invention is given, an MBMS service of a UE will be described herein below. More specifically, a physical channel and a transport channel for a radio link needed to use an MBMS service will be described herein below.

Figure 1:
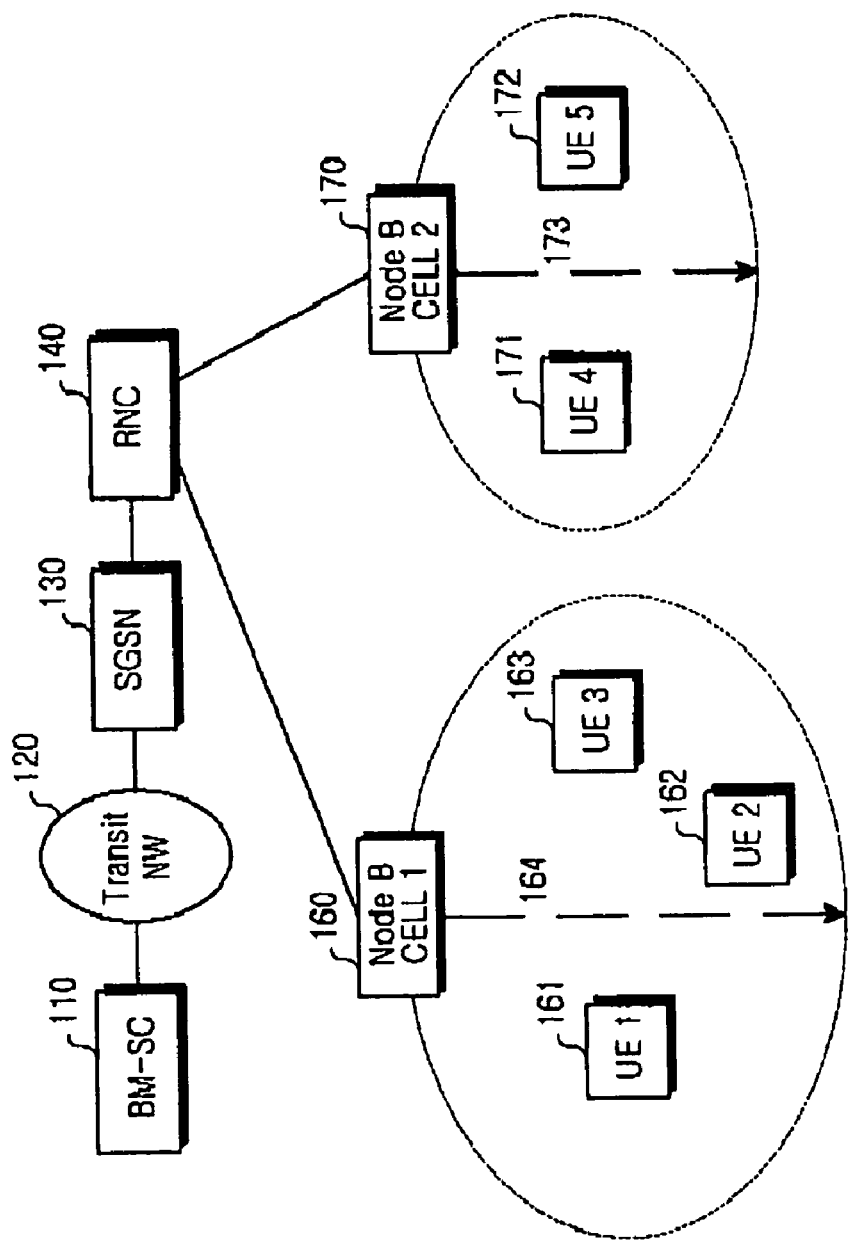
FIG. 1 is a diagram schematically illustrating a configuration of a conventional mobile communication system supporting an MBMS service.
Figure 2:
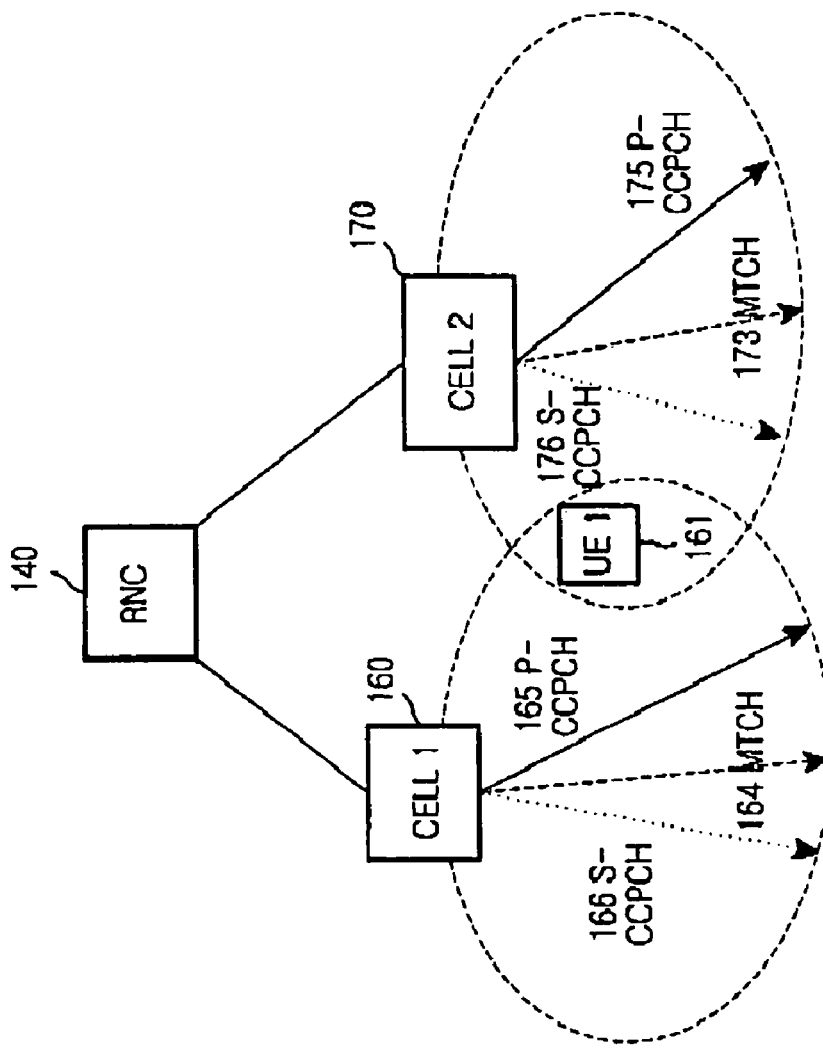
FIG. 2 is a diagram illustrating a cell reselection problem occurring in a UE receiving an MBMS service.

FIG. 2 is a diagram schematically illustrating a procedure for performing cell reselection by a UE using an MBMS service while moving from one cell to another cell. As illustrated in FIG. 2, a cell 1 160 supports an MBMS service through a primary common control physical channel (P-CCPCH) 165, a secondary common control physical channel (S-CCPCH) 166, and an MBMS transport channel (MTCH) 164. Similarly, a cell 2 170 supports an MBMS service through a P-CCPCH 175, an S-CCPCH 176, and an MTCH 173. The MTCHs 164 and 173 carry MBMS service traffic, or data streams. It is assumed herein that the cell 1 160 and the cell 2 170 are controlled by one RNC 140. A UE1 161 receiving the MBMS service from the cell 1 160 moves to the cell 2 170 under the control of the RNC 140 if a signal transmitted from the cell 2 170 satisfies a predetermined condition. Such inter-cell movement is called "cell reselection."

Figure 3:
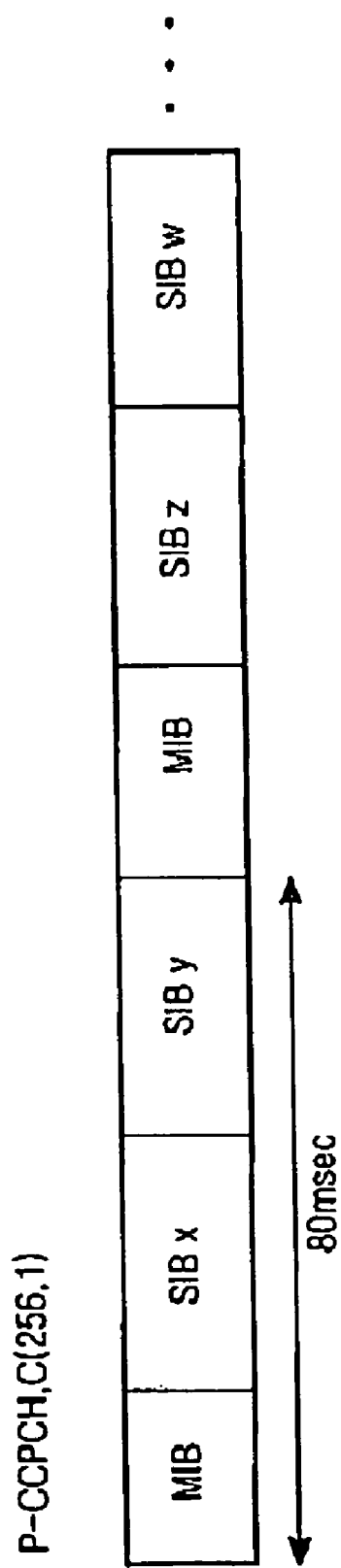
FIG. 3 is a diagram illustrating a format of a primary common control physical channel (P-CCPCH) according to the present invention.

FIG. 3 is a diagram illustrating a format of the P-CCPCHs 165 and 175. Referring to FIG. 3, the P-CCPCH transmits system information of a corresponding cell, and uses a first code C(256,1) among 256 orthogonal variable spreading factor (OVSF) codes available for the corresponding cell. More specifically, the P-CCPCH transmits one master information block (MIB) and one system information block (SIB) for each 80-ms period.

The MIB includes information used to determine whether scheduling information (i.e., scheduling information for each SIB) and system information have been changed, and is repeatedly transmitted for each 80-ms period. The SIB is classified into a total of 16 types of SIBs according to the types of information contained therein, and several typical SIBs will be described herein below.

SIB 1 contains various timer and counter values and information related to a core network (CN). SIB 2 contains an identifier (ID) of a UTRAN registration area (URA) to which a corresponding cell belongs. SIB 3 contains information necessary for cell selection and reselection. SIB 4 contains information necessary for cell selection and reselection, to be used by a UE in a connected mode. SIB 5 contains information related to common channels established in a corresponding cell. SIB 6 contains information related to common channels of a corresponding cell, to be used by a UE in a connected mode.

A UE not having a dedicated channel (DCH) receives SIBs transmitted over the P-CCPCH and stores necessary information in order to receive a service from a particular cell. In particular, the UE receives S-CCPCH-related information of a corresponding cell through the SIB 5 or SIB 6, and accesses an S-CCPCH using the information.

Figure 4:
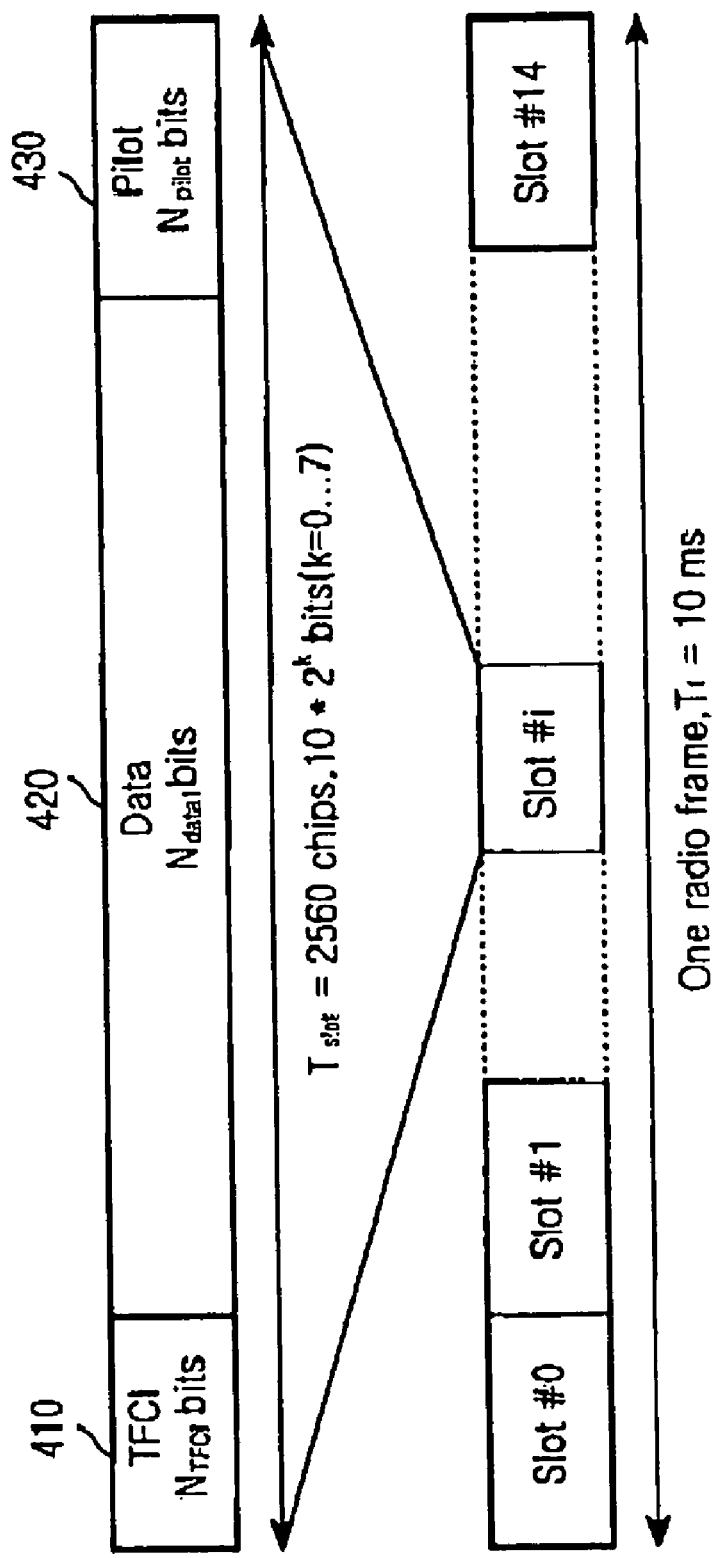
FIG. 4 is a diagram illustrating a format of a secondary common control physical channel (S-CCPCH) according to the present invention.

FIG. 4 is a diagram illustrating a format of the S-CCPCHs 166 and 176. Referring to FIG. 4, the S-CCPCH is mapped with common transport channels such as a forward access channel (FACH) and a paging channel (PCH) for an upper layer. Each radio frame of the S-CCPCH is comprised of 15 slots, and each slot includes a data part 420, a transport format combination indicator (TFCI) part 410, and a pilot part 430. The data part 420 receives (contains) data on a FACH or a PCH. The TFCI part 410 receives TFCI information indicating a transport format (TF) of data transmitted over the data part 420. The pilot part 430 receives pilot bits, which are identification information of a corresponding cell.

The FACH is not a channel subjected to one UE but a transport channel shared by a plurality of UEs. Nevertheless, the FACH is used to transmit data and control information for a particular UE. A UE instructed by an RNC to stay in a particular state, e.g., Cell_FACH state, receives all FACH data transmitted over the S-CCPCH, processes desired data by checking a header part of the received data, and discards the remaining, undesired data.

Figure 5:
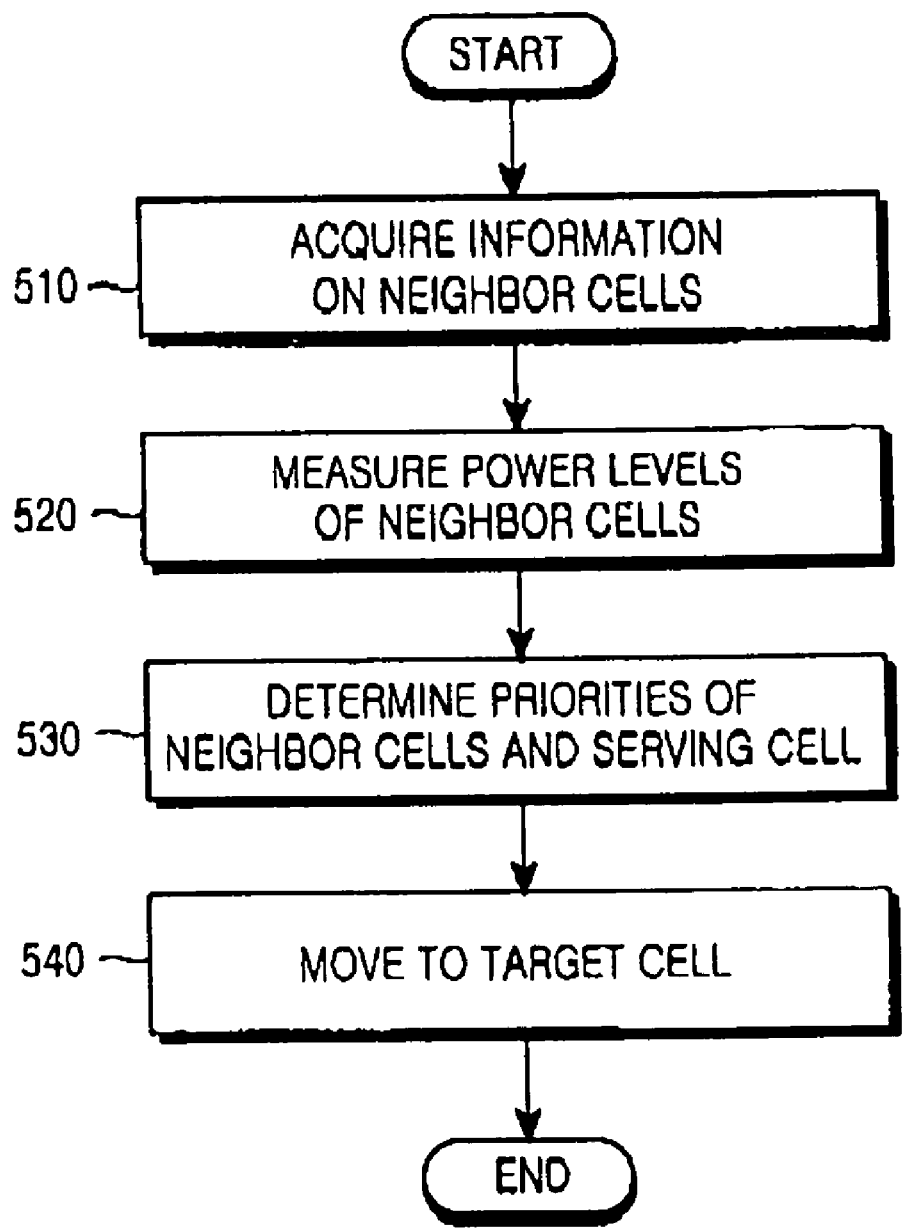
FIG. 5 is a flowchart illustrating a cell reselection operation of a UE in a conventional mobile communication system.

FIG. 5 is a flowchart illustrating a procedure performed while a UE not having a dedicated channel moves from one cell to another cell in an MBMS communication system. Here, "not having a dedicated channel" means that the UE is in any one of an idle mode, a Cell_PCH state, a Cell_FACH state, or a URA_PCH state.

Referring to FIG. 5, in step 510, a UE receives information on neighbor cells from a serving cell currently providing an MBMS service to the UE. The information on neighbor cells includes cell IDs and scrambling codes for the neighbor cells. In order to determine whether to perform cell reselection from the serving cell to the neighbor cells, in step 520, the UE measures power levels of primary common pilot channels (P-CPICHs) sent from the neighbor cells to determine reception qualities for the neighbor cells.

In step 530, the UE compares a reception power level for the serving cell with reception power levels for the neighbor cells. If a reception power level for the serving cell is higher than reception power levels for the neighbor cells, cell reselection is not performed. However, if a reception power level for the serving cell is lower than a reception power level for any one of the neighbor cells, in step 540, the UE selects the neighbor cell having the highest reception power level as a target cell, moves to the target cell, and continuously receives the MBMS service.

In order to receive the MBMS service in the target cell, the UE should receive system information of the target cell and enter a state in which it can start communication. For that purpose, the UE acquires information needed to access channels related to the MBMS service in the target cell.

A channel carrying a data stream for an MBMS service is called an MBMS transmit channel (MTCH). When the MTCH is matched with a particular MBMS stream, if a plurality of MBMS services are provided to one cell, a plurality of MTCHs are established in the cell. In order to receive an MTCH, a UE first receives information transmitted over an MBMS control channel (MCCH). The MCCH provides control information that must be established to receive information necessary for reception of an MTCH and the MTCH. In the present invention, information carried by the MCCH will be referred to as "MTCH control information" or "MTCH data."

Only one MCCH is established in each cell. In order to receive a particular MBMS stream X, a UE acquires information related to the MTCH X over which a data stream for the MBMS service X is to be transmitted, over the MCCH, e.g., radio bearer information of an MTCH X and information on a transport channel and a physical channel to which the MTCH is mapped. In order to minimize a data loss while supporting mobility of a UE receiving an MBMS service, the present invention provides the following schemes.

1. Each cell periodically broadcasts control information related to an MBMS service available in the cell itself, using an MCCH.

2. A UE acquires MBMS service-related control information for a target cell before performing cell reselection so that the UE can start receiving via an MTCH from the target cell as soon as the UE moves to the target cell.

In order to implement the present invention, a UE must determine when it will acquire MBMS control information of neighbor cells. For that purpose, in preferred embodiments of the present invention, a criteria MBMS condition (criteria_MBMS) is defined. A UE acquires MBMS service-related control information only for the cells satisfying the criteria MBMS condition.

Figure 6:
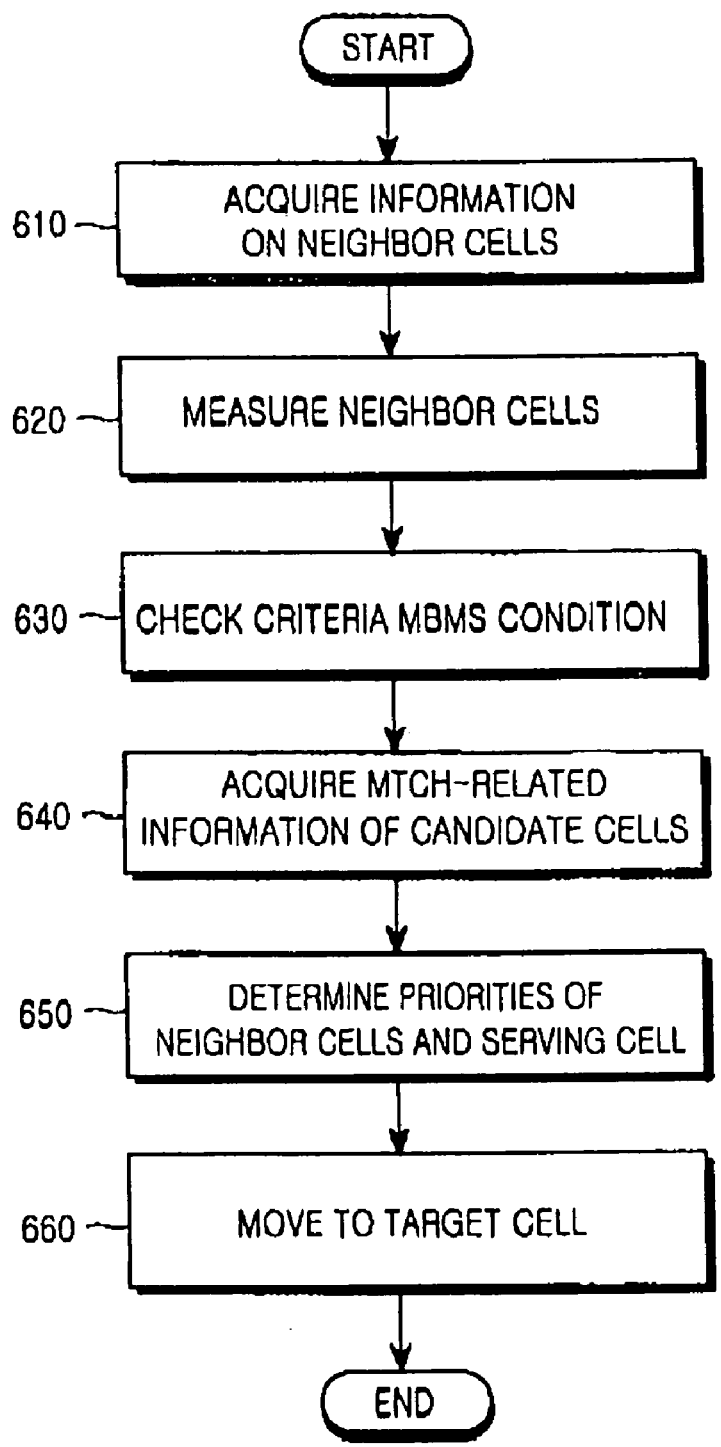
FIG. 6 is a flowchart illustrating a cell reselection operation of a UE in a mobile communication system supporting an MBMS service according to the present invention.

FIG. 6 is a flowchart illustrating a procedure for performing cell reselection by a UE in an MBMS communication system according to the present invention. Referring to FIG. 6, in step 610, a UE collects, from a serving cell, information on neighbor cells and information needed to determine a criteria MBMS condition. Such information is collected using either SIB 3 and SIB 4, or SIB 11 and SIB 12, or using a new SIB. A description will now be made of the collection using SIB 3 and SIB 4, or the SIB 11 and SIB 12.

The SIB 3 and SIB 4 each contain the same kind of system information for the idle mode and the Cell_PCH/URA_PCH/Cell_FACH states. Likewise, the SIB 11 and SIB 12 each contain the same system information for the idle mode and the Cell_PCH/URA_PCH/Cell_FACH states. Therefore, for the convenience of explanation, a combination of the SIB 3 and SIB 4 is expressed as SIB 3/4, and a combination of the SIB 11 and SIB 12 is expressed as SIB 11/12. The SIB 3/4 contains Q_rxlevmin, Q_qualmin, and Q-hyst as parameters needed by a UE for cell reselection. Q_rxlevmin represents a minimum value of a received signal code power (RSCP) for a P-CPICH, and Q_qualmin represents a minimum value of a signal-to-noise ratio, or a chip-energy-to-noise ratio Ec/No, for the P-CPICH. Q-hyst represents a weight provided to give higher priority to a serving cell rather than neighbor cells. In addition, an RNC instructs the UE to determine whether it will use RSCP or Ec/No for cell reselection, through the SIB 3/4.

In addition, the SIB 11/12 contains cell IDs and scrambling codes as information on neighbor cells that must be measured by a UE to perform cell reselection. The UE determines a cell whose P-CPICH it will measure, by receiving the SIB 11/12.

In step 620, the UE measures signal qualities for the neighbor cells. More specifically, the UE measures Q_qualmeas, or Ec/No, and Q_rxlevmeas, or RSCP, for the P-CPICH.

In step 630, the UE determines whether the values measured from the neighbor cells satisfy a criteria MBMS condition. Herein, the cells satisfying the criteria MBMS condition are regarded as candidate cells. Whether the criteria MBMS condition is satisfied is determined by the following formulas.

Criteria MBMS Condition $S\_rxlev > 0$ and $S\_qual > 0$ $S\_rxlev = Q\_rxlevmeas - Q\_rxlevmin$ $S\_qual = Q\_qualmeas - Q\_qualmin$ The Q_rxlevmin and Q_qualmin parameters are values transmitted to the UE over the SIB 3/4, and the Q_rxlevmeas and Q_qualmeas parameters are signal quality values measured in the step 620. That is, among the neighbor cells, neighbor cells having Q_rxlevmeas and Q_qualmeas being higher than the Q_rxlevmin and Q_qualmin are regarded as candidate cells.

In step 640, the UE receives MCCH data transmitted from the candidate cells and stores the received MCCH data. When there are multiple candidate cells, the UE receiving via the MCCHs transmitted from the candidate cells and stores all necessary information.

In step 650, the UE determines whether to perform cell reselection to any one of the candidate cells. In step 650, priorities of the candidate cells are compared with a priority of the serving cell. The priority R_s of the serving cell and the priorities R_n of the candidate cells are calculated by the following formulas.

Calculation of R_s and R_n $R\_s = Q\_meas\_s + Q\_hyst\_s$ $R\_n = Q\_meas\_n - Q\_offset\_s\_n$ In the foregoing formulas, Q_meas_s denotes Q_rxlevmeas or Q_qualmeas of the serving cell. Q_meas_n denotes Q_rxlevmeas or Q_qualmeas of neighbor cells. Q_hyst_s is a value given by the SIB 3/4 and denotes a weight for giving higher priority to the serving cell rather than the neighbor cells. Q_offset_s_n is a value given for neighbor cells by the SIB 11/12 and serves to give priority for cell reselection to each cell. For example, an RNC designates Q_offset_s_n of a neighbor cell 'b' having high cell reselection priority to a value lower than that of a neighbor cell 'a' having relatively higher priority.

That is, in step 650, the UE determines whether there is a candidate cell having R_n that is higher than R_s of the serving cell. If there is a candidate cell having R_n that is higher than R_s of the serving cell, the UE selects the corresponding candidate cell as a target cell.

In step 660, if MTCH control information (radio channel information of MTCH that the UE requests) for the target cell is stored in the UE, the UE moves to the target cell and turns to the MTCH of the target cell using the MTCH control information. If the UE does not have the MTCH control information for the target cell, it performs an operation necessary for acquiring MTCH control information for the target cell.

A description will now be made of some preferred embodiments of the present invention regarding a format of an MCCH for acquiring MTCH control information for the target cell by the UE.

First Embodiment

Figure 7:
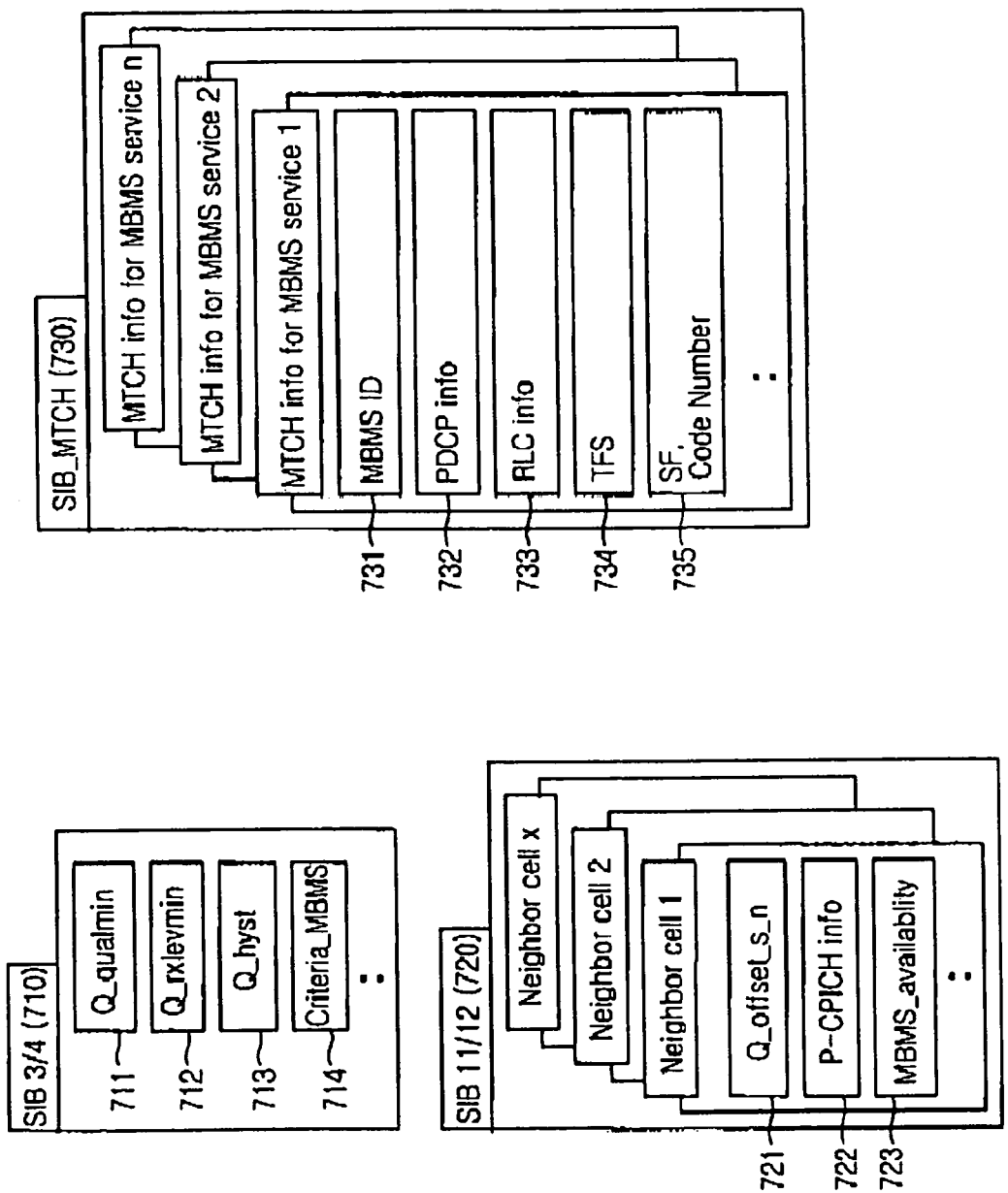
FIG. 7 is a diagram illustrating a format of system information blocks (SIBs) according to a first embodiment of the present invention.

FIG. 7 is a diagram illustrating a format of SIBs according to a first embodiment of the present invention. In the first embodiment, MTCH control information is transmitted over a P-CCPCH. In the first embodiment, SIB_MTCH 730 is used, which contains information necessary for reception of MTCH and is transmitted over P-CCPCH.

Referring to FIG. 7, an RNC establishes SIB_MTCHs 730 for its own individual cells, and provides the SIB_MTCHs 730 to individual Node Bs controlling corresponding cells. If any one of the SIB_MTCHs is changed, the changed information is transmitted to a corresponding Node B.

The SIB_MTCH 730 includes MTCH control information for each MBMS service. If n MBMS services are provided in a particular cell, SIB_MTCH 730 broadcasted from the cell includes n MTCH control information blocks. The MTCH control information includes (i) an MBMS ID 731, which is an ID of an MBMS stream transmitted over a corresponding MTCH, (ii) a packet data convergence protocol (PDCP) 732 formed for an MBMS stream transmitted over a corresponding MTCH, (iii) information 733 on a radio link control (RLC) entity formed for an MBMS stream transmitted over a corresponding MTCH, (iv) a transport format set (TFS) 734 for transport formats of an MBMS stream transmitted over a corresponding MTCH, and (v) spreading factor (SF) and code number 735 for a code channel transmitting a corresponding MTCH.

A UE accesses an MTCH of a corresponding cell using the MTCH control information acquired through the SIB_MTCH 730 and receives a desired MBMS service.

Before receiving SIB_MTCH 730, the UE acquires information for cell reselection from SIB 3/4 710 and SIB 11/12 720. The SIB 3/4 710 includes Q_qualmin 711, Q_rxlevmin 712, and Q_hyst 713. As described above, the Q_qualmin 711 represents minimum Ec/No of P-CPICH, and the Q_rxlevmin 712 indicates a minimum RSCP of P-CPICH. In addition, the Q_hyst 713 is a value provided to give higher priority to a serving cell rather than neighbor cells.

In addition, the SIB 3/4 710 includes a criteria MBMS parameter criteria_MBMS 714 for designating a reception time of MCCH control information for neighbor cells and cell reselection criteria. For example, the criteria MBMS parameter 714 includes a bit indicating whether the UE will use RSCP or Ec/No of P-CPICH to select a target cell from the candidate cells.

The SIB 11/12 720 includes information on neighbor cells. The information on the neighbor cells includes Q_offset_s_n 721 for each of the neighbor cells, information 722 necessary for reception of P-CPICH, and MBMS availability information MBMS_availability 723. The Q_offset_s_n 721 is a value for giving separate reselection priority to each cell. The P-CPICH information 722 serves as a cell ID and includes primary scrambling code information of a corresponding cell. The MBMS_availability 723 is information indicating whether an MBMS service is available in a corresponding neighbor cell. If a particular neighbor cell does not provide an MBMS service, the UE does not consider the neighbor cell as a candidate cell even though the neighbor cell satisfies a criteria MBMS condition. Here, the phrase "considering a neighbor cell as a candidate cell" means that the UE receives MTCH-related control information of a corresponding neighbor cell and previously stores the received control information.

Figure 8A:
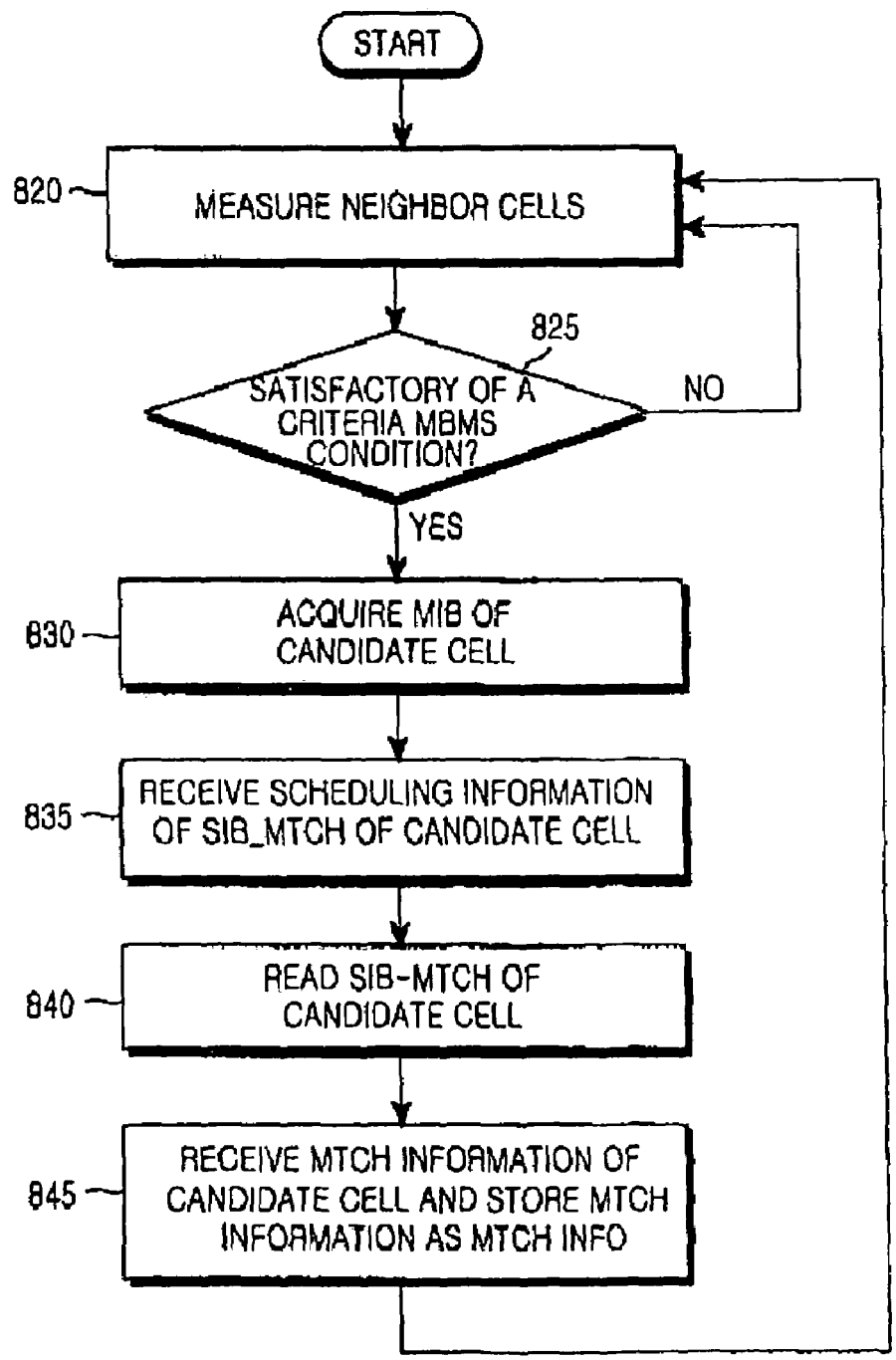
FIGS. 8A and 8B are flowcharts illustrating a cell reselection operation of a UE according to the first embodiment of the present invention.
Figure 8B:
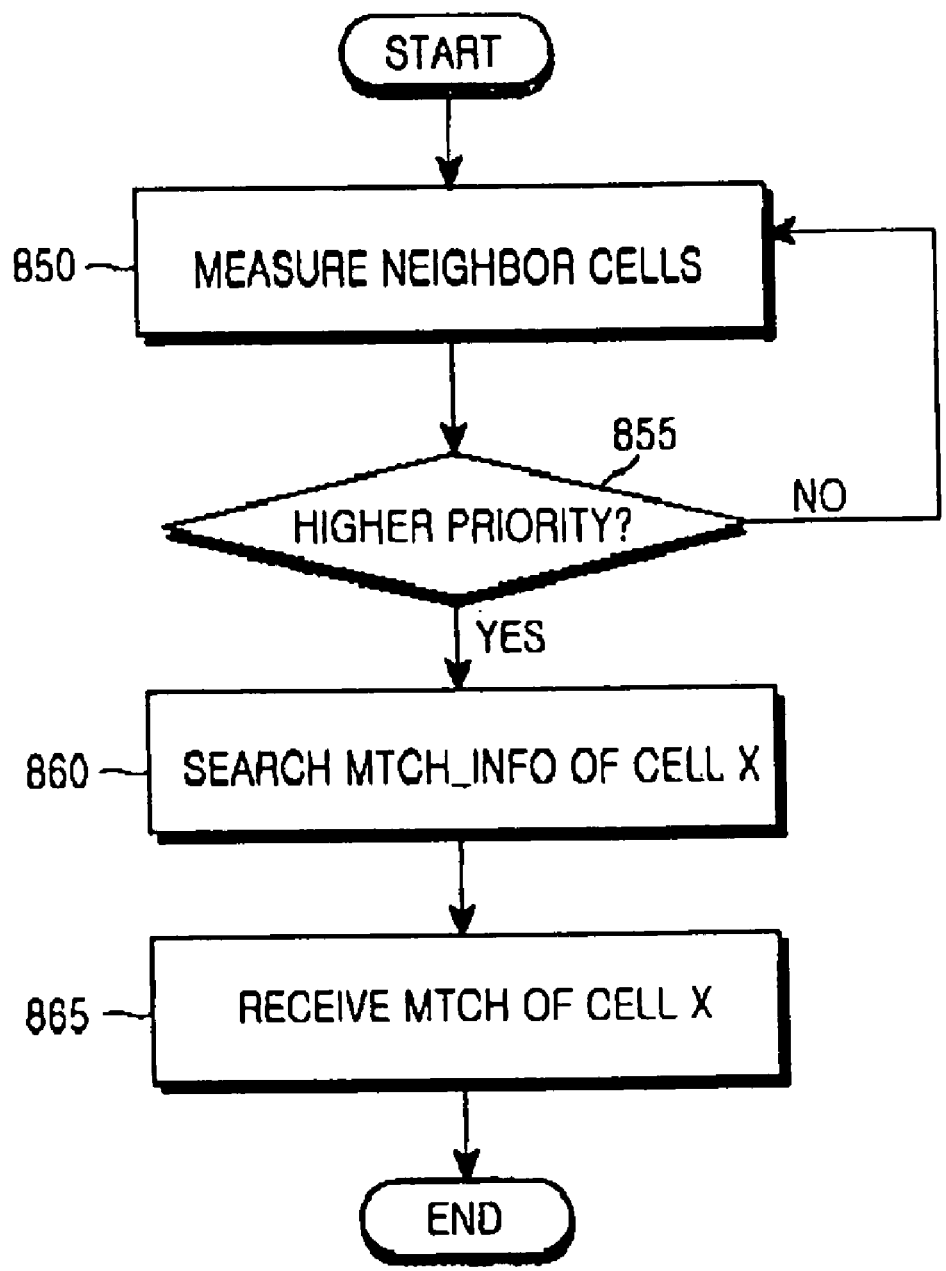

FIGS. 8A and 8B are flowcharts illustrating an operation of a UE according to a first embodiment of the present invention. First, a method of acquiring MTCH-related control information of neighbor cells by a UE will be described with reference to FIG. 8A. It is assumed herein that the UE has already acquired SIB 3/4 and SIB 11/12 of a serving cell while receiving an MBMS service in the serving cell.

In step 820, the UE measures P-CPICH signals from neighbor cells. Information on the neighbor cells is received through the SIB 11/12 of the serving cell, and information on the measurement objects is received through the SIB 3/4. Parameters measured in step 820 include Q_qualmeas, or Ec/No, and Q_rxlevmeas, or RSCP.

After measuring Q_qualmeas and Q_rxlevmeas, the UE determines whether one of the neighbor cells satisfies a criteria MBMS condition in step 825. The "criteria MBMS condition" indicates that the RSCP measurement value Q_rxlevmeas is larger than the minimum P-CPICH RSCP value Q_rxlevmin detected through the SIB 3/4, and the Ec/No measurement value Q_qualmeas is larger than the minimum P-CPICH Ec/No value Q_qualmin detected through the SIB 3/4.

If there are neighbor cells satisfying the condition that the RSCP measurement value Q_rxlevmeas is larger than the minimum RSCP value Q_rxlevmin and the Ec/No measurement value Q_qualmeas is larger than the minimum Ec/No value Q_qualmin, the UE regards the neighbor cells satisfying the criteria MBMS condition as candidate cells, and then proceeds to step 830. However, if there are no candidate cells, the UE returns to step 820. In this case, the UE can use MBMS availability information of the neighbor cells included in the SIB 11/12 before being transmitted. That is, the UE proceeds to step 830 only when the MBMS availability of the neighbor cells is 'TRUE', and the UE returns to step 820 when the MBMS availability is 'FALSE'.

In step 830, the UE receives MIB of the candidate cells and decodes the received MIB. The MIB is broadcasted for each 80-ms period, and contains scheduling information of SIBs transmitted over the P-CCPCH. In step 835, the UE receives scheduling information of SIB_MTCH from the MIB. In step 840, the UE receives the SIB_MTCH based on the scheduling information and decodes the received SIB_MTCH.

In step 845, if MTCH control information for an MBMS service that the UE desires to receive exists in the SIB_MTCH, the UE stores the MTCH control information as MTCH_INFO, and then returns to step 820

FIG. 8B is a flowchart illustrating a procedure for reselecting a particular target cell by a UE. The procedure of FIG. 8B is performed in parallel with or after the procedure of FIG. 8A.

Referring to FIG. 8B, in step 850, the UE starts measuring P-CPICHs from a serving cell and neighbor cells. The measurement in the step 850 is substantially identical to the measurement in the step 820. Preferably, the UE measures RSCP and Ec/No of P-CPICHs from the neighbor cells or the candidate cells determined in the step 825. In step 855, the UE determines priorities of candidate cells and a serving cell using the measurement values. The priorities are determined by comparing R_n calculated for the candidate cells with R_s calculated for the serving cell. If R_n of a certain candidate cell X is higher than R_s of the serving cell, the UE proceeds to step 860, and if R_s is higher than R_n of all candidate cells, the UE returns to step 850. Here, a candidate cell having the highest R_n among the candidate cells having R_n that is higher than R_s of the serving cell is selected as a target cell.

In step 860, the UE determines whether control information necessary for reception of MTCH from the target cell is stored in MTCH_INFO. If the control information is stored in MTCH_INFO, the UE reconstructs in step 865 a receiver using the MTCH control information and starts receiving an MBMS service data stream transmitted over MTCH of the target cell.

In the first embodiment, because the MTCH control information is transmitted over SIB_MTCH of P-CCPCH, the UE can rapidly acquire MTCH-related information of the candidate cells. However, because of the limited capacity of the P-CCPCH, when one cell provides a plurality of MBMS services, it is not easy to transmit all SIB_MTCHs for the MBMS services.

Second Embodiment

Accordingly, a second embodiment of the present invention is provided, which resolves the above-described shortcoming of the first embodiment. In the second embodiment MBMS service-related information is broadcast over an S-CCPCH in order to resolve the capacity problem of the P-CCPCH. In the second embodiment, MCCH control information for an MBMS service is periodically transmitted over an MCCH mapped to the S-CCPCH. Scheduling information of the MCCH is transmitted over an SIB_MCCH of the P-CCPCH. The S-CCPCH-related information is transmitted to UEs in a cell through SIB 5/6.

That is, a UE receives MIB of candidate cells after identifying the candidate cells according to a criteria MBMS condition, and then receives SIB_MCCH and SIB 5/6 included in P-CCPCH using the MIB. Then the UE receives MCCH mapped to the S-CCPCH, using the SIB 5/6 and the SIB_MCCH, and acquires MTCH-related control information of the candidate cells from the received MCCH.

Figure 9:
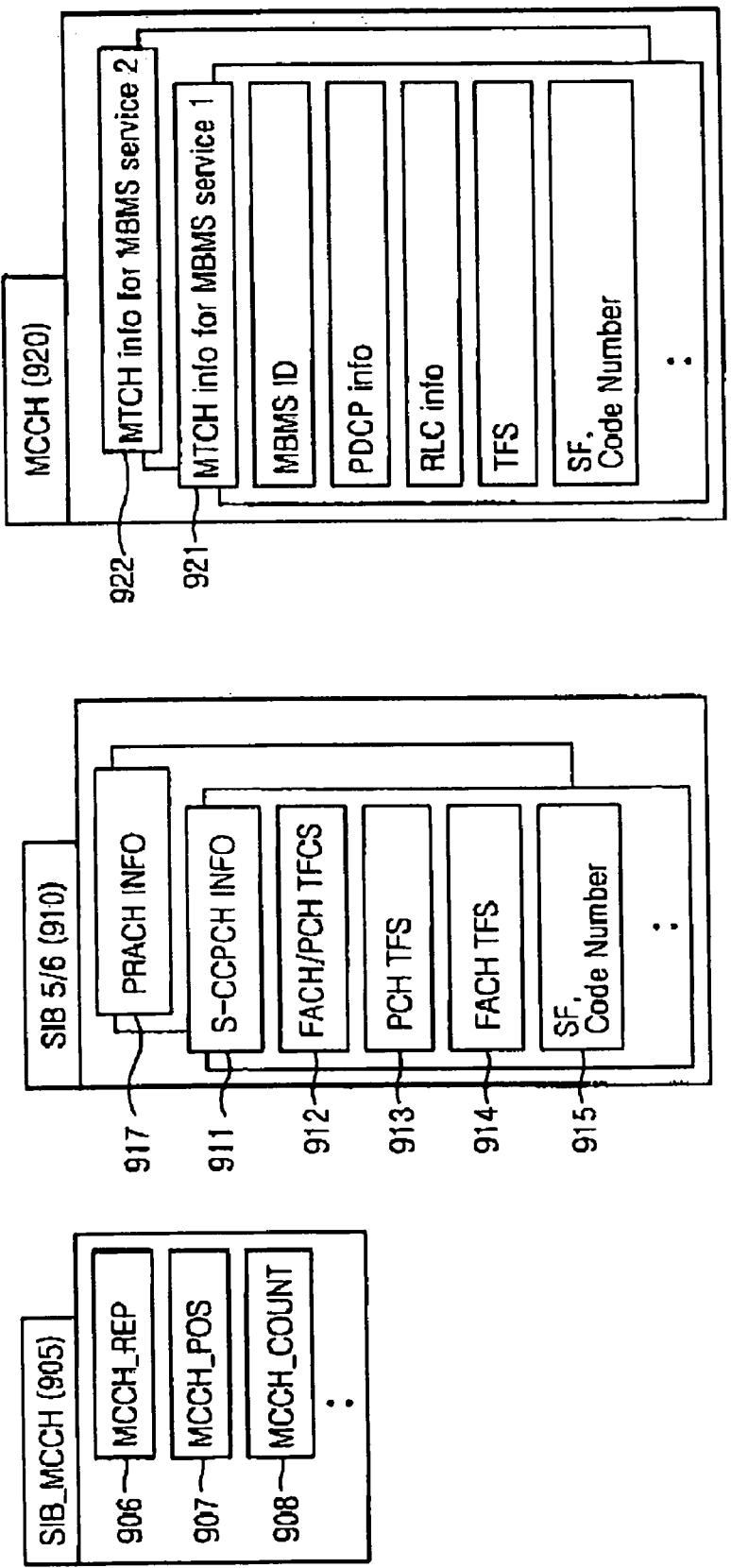
FIG. 9 is a diagram illustrating a format of SIBs according to a second embodiment of the present invention.

FIG. 9 is a diagram illustrating information necessary for supporting the second embodiment of the present invention. Referring to FIG. 9, scheduling information of MCCH is notified to UEs in a cell over SIB_MCCH 905. MCCH data 920 is transmitted over S-CCPCH. Because a format of the S-CCPCH can be formed in various ways for individual cells, a method for mapping MCCH to the S-CCPCH can also be defined in various ways.

Figure 10:
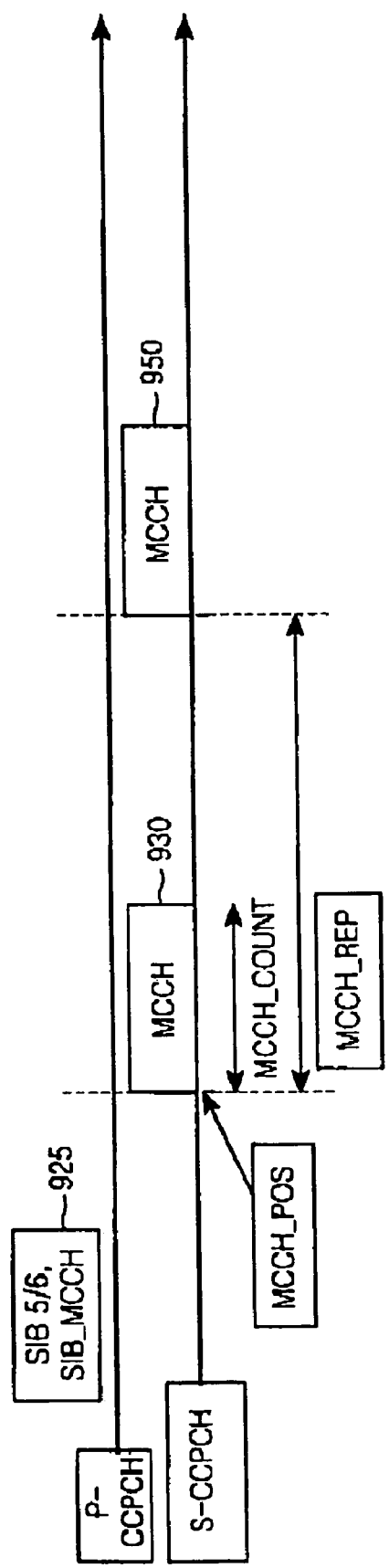
FIG. 10 is a diagram illustrating a format of a primary common control physical channel (P-CCPCH) and a secondary common control physical channel (S-CCPCH) according to the second embodiment of the present invention.

FIG. 10 is a diagram illustrating a preferred example of transmitting MCCH data, and in this example, the MCCH data is mapped in a particular time period of S-CCPCH. Referring to FIG. 10, when a target cell is selected in order to receive an MBMS service, UEs acquires S-CCPCH-related information through SIB 5/6 910 transmitted over a P-CCPCH of the selected target cell. Further, the UE acquires scheduling information of the MCCH mapped to the S-CCPCH through SIB_MCCH 905 transmitted over P-CCPCH of the target cell. Then the UE receives MTCH control information transmitted over the MCCH 920 using the scheduling information.

The MCCH data 920 includes MTCH control information 921 and 922 for the respective MBMS services provided in a corresponding cell. The MTCH control information includes (i) an MBMS ID, which is an ID of an MBMS stream transmitted over MTCH, (ii) information on a packet data convergence protocol (PDCP) formed for an MBMS stream transmitted over a corresponding MTCH, (iii) information on a radio link control (RLC) entity formed for an MBMS stream transmitted over a corresponding MTCH, (iv) a transport format set (TFS) for transport formats of an MBMS stream transmitted over a corresponding MTCH, and (v) an SF and a code number for a code channel transmitting a corresponding MTCH.

The SIB 5/6 910 includes information 911 and 917 on common channels constituting a cell, i.e., S-CCPCH and a packet random access channel (PRACH). When transport channels such as a paging channel (PCH) and a forward access channel (FACH) are multiplexed to the S-CCPCH, TFSs 913 and 914 for the respective transport channels are notified through the SIB 5/6 910. In addition, SF and code number 915 of a code channel to be transmitted over the S-CCPCH, and transport format combination set (TFCS) information 912 of transport channels multiplexed to the S-CCPCH are also notified through the SIB 5/6 910.

The SIB_MCCH 905 includes such parameters as MCCH_REP 906, MCCH_POS 907, and MCCH_COUNT 908, which are scheduling information of MCCH mapped to the S-CCPCH.

Referring to FIG. 10, MCCH frames 930 and 950 containing the MCCH data 920 are broadcasted on the S-CCPCH at periods of the MCCH_REP 906 with a length of the MCCH_COUNT 908. A start point of the MCCH frames 930 and 950 becomes the MCCH_POS 907. A unit of the MCCH_REP 906 and the MCCH_COUNT 908 becomes a radio frame having a length of, for example, 10 ms. The MCCH_POS 907 is expressed as a system frame number (SFN) of a corresponding cell. The SFN is a value broadcasted over P-CCPCH, and is a value of a radio frame unit having a value between 0 and 4095.

A UE receives the MCCH data 920 of a corresponding cell based on the MCCH_POS 907, MCCH_REP 906, and MCCH_COUNT 908. That is, the UE regards S-CCPCH data received for the MCCH_COUNT 908 from SFN of MCCH_POS 907+k*MCCH_REP 906 (where k=0, ...), as the MCCH data 920. The MCCH can be mapped to an FACH, which is a transport channel.

Figure 11A:
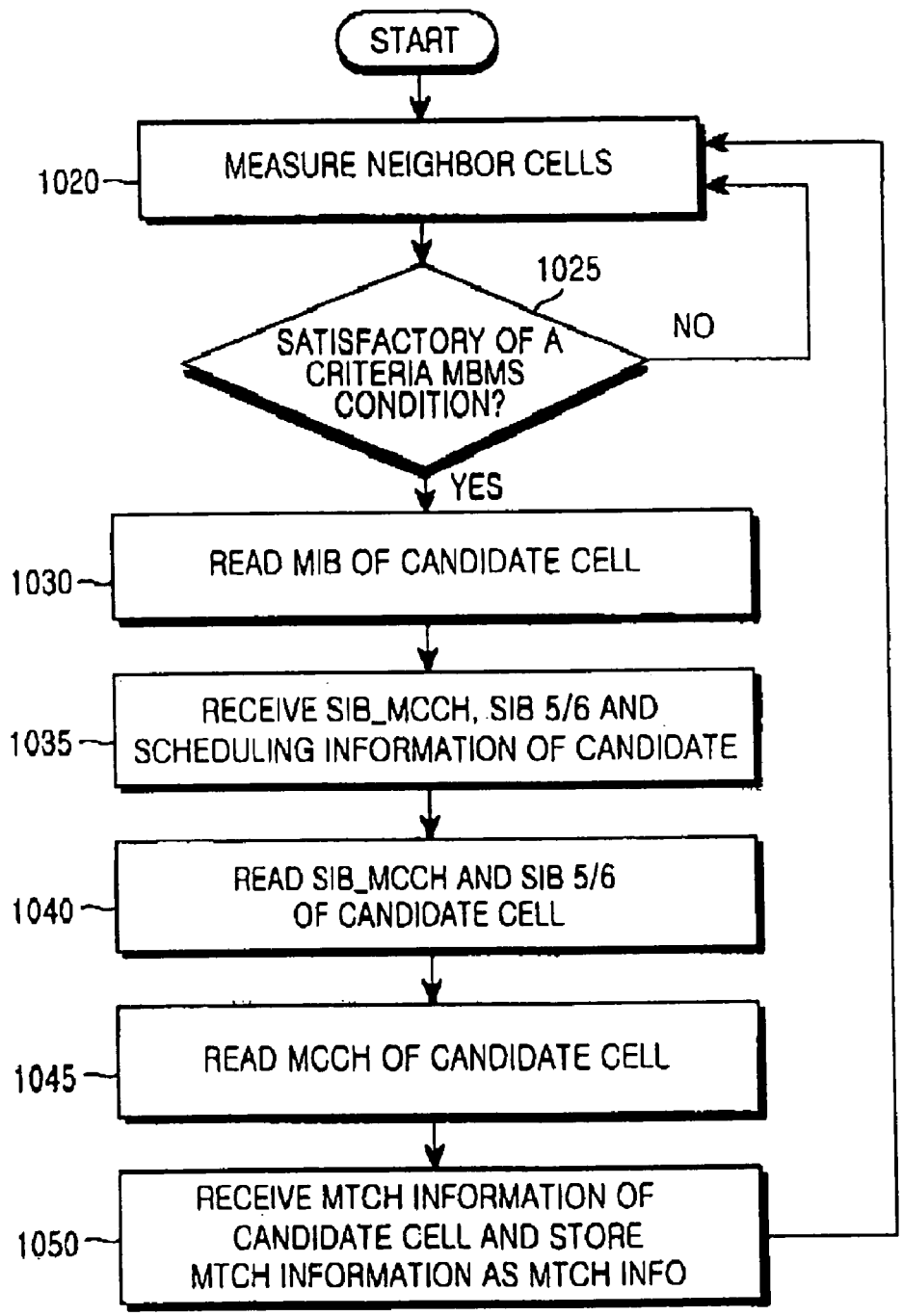
FIGS. 11A and 11B are flowcharts illustrating a cell reselection operation of a UE according to the second embodiment of the present invention.
Figure 11B:
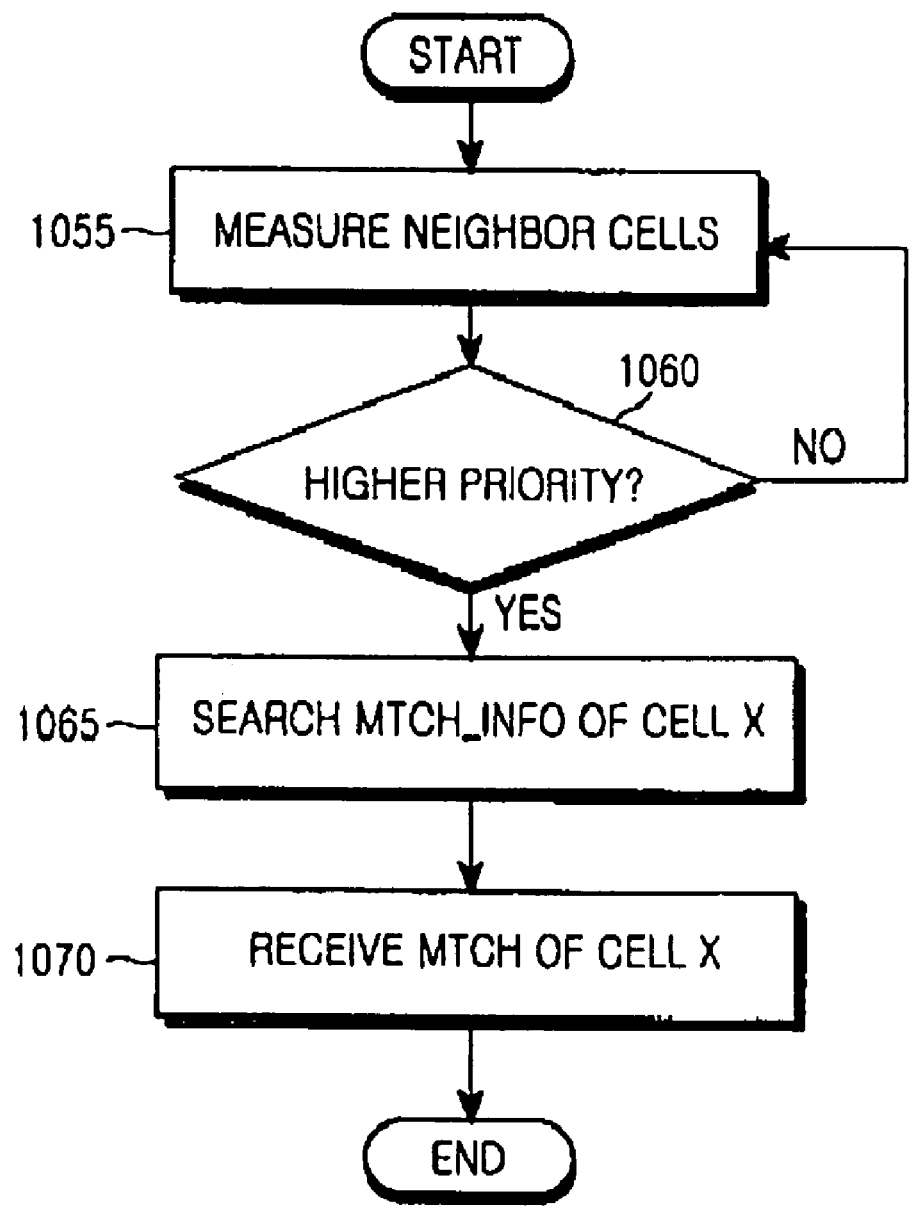

FIGS. 11A and 11B are flowcharts illustrating an operation of a UE according to the second embodiment of the present invention. First, an operation of acquiring MTCH control information of neighbor cells by a UE will be described with reference to FIG. 11A. It is assumed herein that the UE has already acquired SIB 3/4 and SIB 11/12 of a serving cell while using an MBMS service in the serving cell. The SIB 3/4 includes a criteria MBMS parameter for designating a reception time of MCCH control information for neighbor cells and cell reselection criteria. The SIB 11/12 includes information of neighbor cells which become measurement objects, specifically, includes cell IDs and P-CPICH information. Information included in the SIB 3/4 and SIB 11/12 has already been described with reference to FIG. 7.

Referring to FIG. 11A, in step 1020, the UE measures P-CPICHs from neighbor cells. Information on the neighbor cells is received through the SIB 11/12 of the serving cell, and information on the measurement objects is received through the SIB 3/4. Parameters measured in the step 1020 include Q_qualmeas or Ec/No, and Q_rxlevmeas or RSCP.

After measuring Q_qualmeas and Q_rxlevmeas for the neighbor cells, the UE determines whether one of the neighbor cells satisfies a criteria MBMS condition in step 1025. The "criteria MBMS condition" indicates that the RSCP measurement value Q_rxlevmeas is larger than the minimum P-CPICH RSCP value Q_rxlevmin detected through the SIB 3/4, and the Ec/No measurement value Q_qualmeas is larger than the minimum P-CPICH Ec/No value Q_qualmin detected through the SIB 3/4.

If there are neighbor cells satisfying the condition that the RSCP measurement value Q_rxlevmeas is larger than the minimum RSCP value Q_rxlevmin and the Ec/No measurement value Q_qualmeas is larger than the minimum Ec/No value Q_qualmin, the UE identifies the neighbor cells satisfying the criteria MBMS condition as candidate cells, and then proceeds to step 1030. However, if there are no candidate cells the UE returns to step 1020. In this case, the UE can use MBMS availability information of the neighbor cells included in the SIB 11/12 before being transmitted.

In step 1030, the UE receives MIB on P-CCPCHs of the candidate cells and reads the received MIB. The MIB is broadcasted for each 80-ms period, and contains scheduling information of SIBs transmitted over the P-CCPCH. In step 1035, the UE acquires scheduling information of SIB_MCCH 905 and SIB 5/6 910 from the MIB. In step 1040, the UE reads the SIB_MCCH 905 and the SIB 5/6 910 on the P-CCPCH of the candidate cells, using the scheduling information. As described above, the SIB 5/6 910 includes code information and transport format information of the S-CCPCH, needed to receive the S-CCPCH, and the SIB_MCCH 905 includes parameters indicating a time for which the MCCH data 920 is broadcasted over the S-CCPCH.

In step 1045, the UE receives the MCCH data 920 on the S-CCPCH using the SIB 5/6 910 and the SIB_MCCH 905 and decodes the received MCCH data 920. In step 1050, if MTCH control information for an MBMS service that the UE desires to receive exists in the MCCH data 920, the UE stores the MTCH control information as MTCH_INFO, and then returns to step 1020.

FIG. 11B is a flowchart illustrating a procedure for reselecting a particular target cell by a UE. The procedure of FIG. 11B is performed in parallel with or after the procedure illustrated in FIG. 11A.

Referring to FIG. 11B, in step 1055, the UE measures P-CPICHs from a serving cell and neighbor cells. The measurement in the step 1055 is substantially identical to the measurement in the step 1020. Preferably, the UE measures RSCP and Ec/No of P-CPICHs from the neighbor cells or the candidate cells determined in step 1025.

In step 1060, the UE determines priorities of candidate cells and a serving cell using the measurement values. The priorities are determined by comparing R_n calculated for the candidate cells with R_s calculated for the serving cell. If R_n of a certain candidate cell X is higher than the R_s of the serving cell, the UE proceeds to step 1065, but if the R_s is higher than R_n of all candidate cells, the UE returns to step 1055. Here, a neighbor cell having R_n that is higher than R_s of the serving cell is selected as a target cell.

In step 1065, the UE determines whether MTCH control information of the target cell is stored in MTCH_INFO. If the MTCH control information is stored in MTCH_INFO, the UE reconstructs a receiver using the MTCH control information and starts receiving an MBMS service data stream transmitted over MTCH of the target cell in step 1070.

In the second embodiment, a specific time is required to acquire MTCH control information by the UE for neighbor cells (i.e., candidate cells) satisfying a criteria MBMS condition. That is, the UE measures signal values for neighbor cells, and if the measured values satisfy a predetermined condition, the UE receives via the P-CCPCH and S-CCPCH of the corresponding candidate cells. Accordingly, the UE must receive data via the P-CCPCH and the S-CCPCH of the candidate cells in order to acquire MTCH control information of the candidate cells.

That is, in the second embodiment, the UE must acquire MTCH control information transmitted over an MCCH after receiving MIB of candidate cells and receiving SIB 5/6 and SIB_MCCH. However, if the UE performs cell reselection to a particular target cell before it completely acquires MTCH control information of the candidate cells, the UE must receive data via MTCH of the target cell after completing acquisition of MTCH control information, inevitably causing a data loss.

Third Embodiment

A third embodiment of the present invention provides a method for transmitting MCCH configuration information of neighbor cells over an MCCH of a serving cell so that a UE can access the MCCH of the neighbor cells without receiving MIB, SIB_MCCH, and SIB 5/6 of the neighbor cells. Because the UE can directly receive MCCH data of a candidate cell using previously stored MCCH configuration information when a particular neighbor cell is recognized as the candidate cell, it is possible to reduce a time required for acquiring MTCH information.

Figure 12:
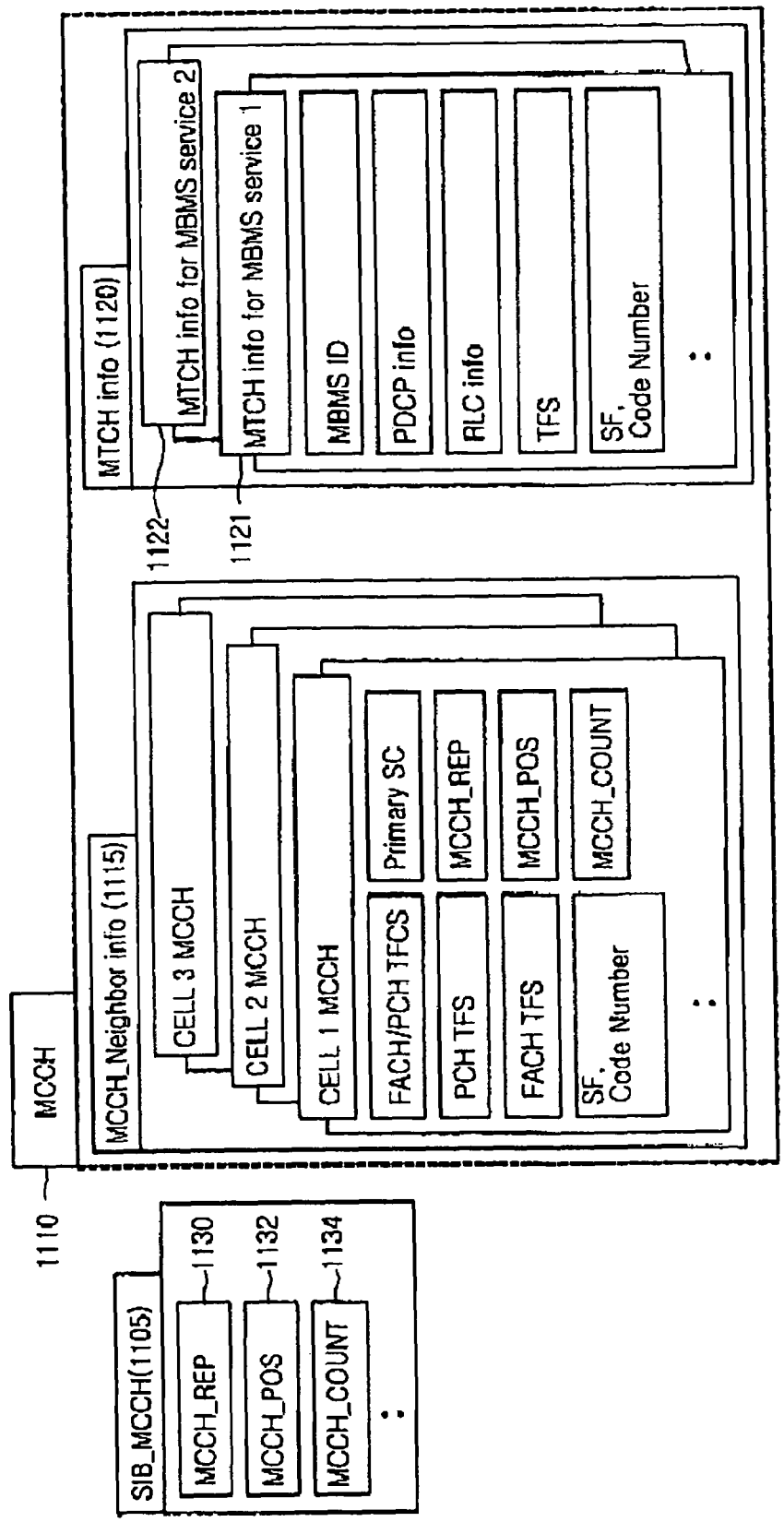
FIG. 12 is a diagram illustrating a format of SIBs according to a third embodiment of the present invention.

FIG. 12 is a diagram illustrating information necessary for supporting the third embodiment of the present invention. Referring to FIG. 12, MCCH data 1110 includes MCCH configuration information MCCH_Neighbor_info 1115 of neighbor cells and MTCH control information MTCH_info 1120 of a serving cell. The MTCH control information 1120 includes information 1121 and 1122 for MBMS services provided in a corresponding serving cell. The MCCH configuration information 1115 includes information for neighbor cells.

The MCCH data 1110 is transmitted over predetermined time periods of a S-CCPCH. Preferably, for example, MCCH data is mapped to specific time periods of the S-CCPCH as illustrated in FIG. 10, and information on the time periods is notified to UEs over SIB_MCCH 1105.

The UE initially selects a particular serving cell in order to receive an MBMS service, acquires S-CCPCH-related information through SIB 5/6 (similar to the SIB 5/6 910 of FIG. 9) transmitted over P-CCPCH of the selected serving cell, and acquires MCCH data. Further, the UE acquires the configuration information 1115 for a desired MBMS service over MCCH of the serving cell, and also acquires MCCH data MCCH_neighbor of neighbor cells. Based on the MCCH_neghbor of neighbor cells, the UE can rapidly access MCCHs of neighbor cells when reselecting the neighbor cells.

The MCCH_Neighbor info 1115 includes information on S-CCPCHs of neighbor cells, and scheduling information of MCCH data mapped to the S-CCPCHs of the neighbor cells. In other words, the MCCH_Neighbor info 1115 includes SIB 5/6 and SIB_MCCH information of the neighbor cells.

The UE directly accesses a MCCH of a candidate cell and acquires the MTCH control information, using the MCCH_Neighbor info 1115 transmitted over the MCCH of the serving cell.

The MCCH_Neighbor info 1115 includes, for each neighbor cell, a primary scrambling code (SC), S-CCPCH information of FACH/PCH TFCS, PCH/FACH TFS, SF and Code Number, to which MCCH is mapped, and MCCH scheduling information SIB_MCCHx_REP, SIB_MCCHx_POS, and SIB_MCCHx_COUNT of neighbor cells. Here, a letter 'x' indicates a neighbor cell index. Scheduling information for MCCH of the serving cell is notified to UEs over SIB_MCCH 1105. The SIB_MCCH 1105 includes MCCH scheduling information such as MCCH_REP 1130, MCCH_POS 1132, and MCCH_COUNT 1134. The scheduling information of the serving cell and neighbor cells has already been described above with reference to FIG. 10.

That is, the MCCH data 1110 is broadcasted over an S-CCPCH at periods of MCCH_REP 1130 with a length of MCCH_COUNT 1134. A start point of the MCCH data 1110 becomes the MCCH_POS 1132. A unit of the MCCH_REP 1130 and the MCCH_COUNT 1134 becomes a radio frame having a length of, for example, 10 ms. The MCCH_POS 1132 is expressed as a system frame number (SFN) of a corresponding cell. The SFN is a value broadcasted over a P-CCPCH, and is a value of a radio frame unit having a value between 0 and 4095.

A UE receives the MCCH data 1110 on S-CCPCH based on the MCCH_POS 1132, MCCH_REP 1130, and MCCH_COUNT 1134. That is, the UE regards S-CCPCH data received for the MCCH_COUNT 1134 from SFN of MCCH_POS 1132+k*MCCH_REP 1130 (where k=0, . . . ), as the MCCH data 1110. The MCCH data can be mapped to an FACH, which is a transport channel.

Figure 13A:
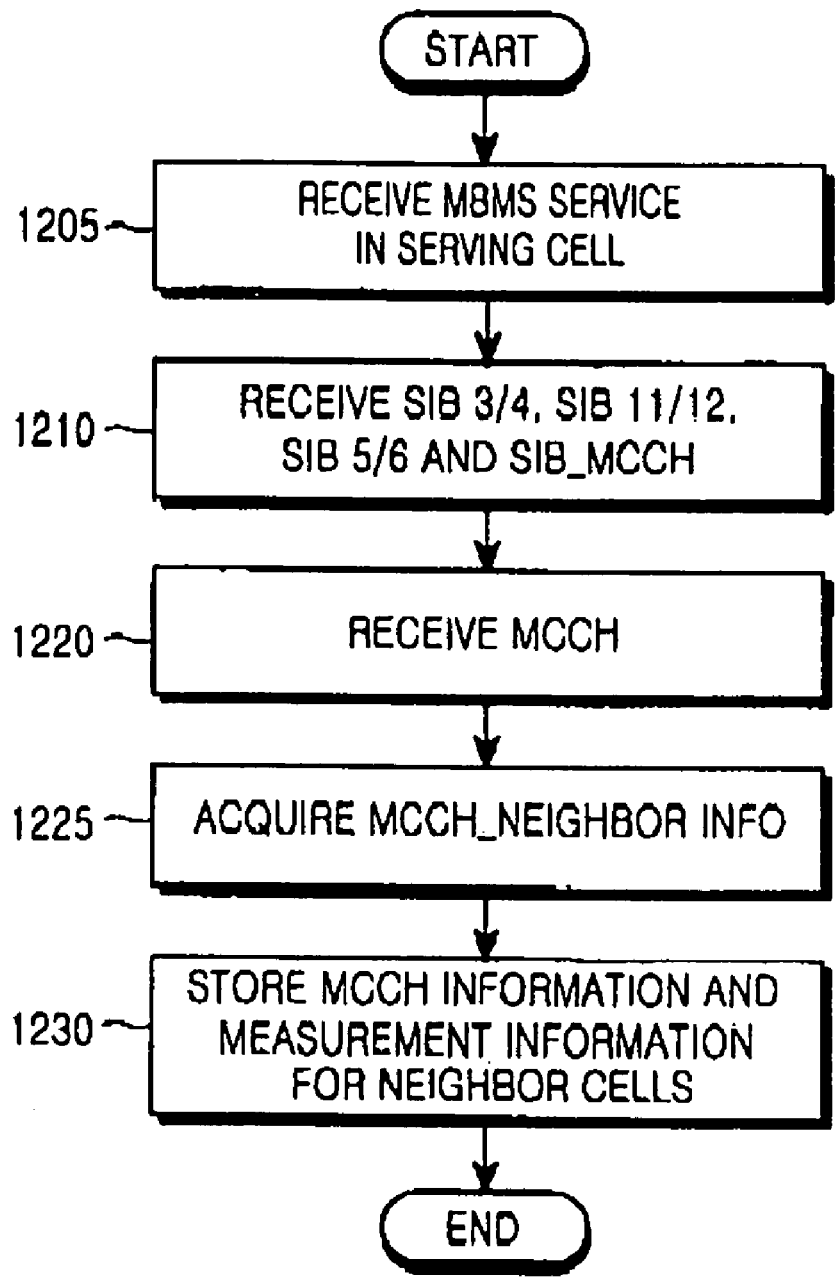
FIGS. 13A to 13C are flowcharts illustrating a cell reselection operation of a UE according to the third embodiment of the present invention.
Figure 13B:
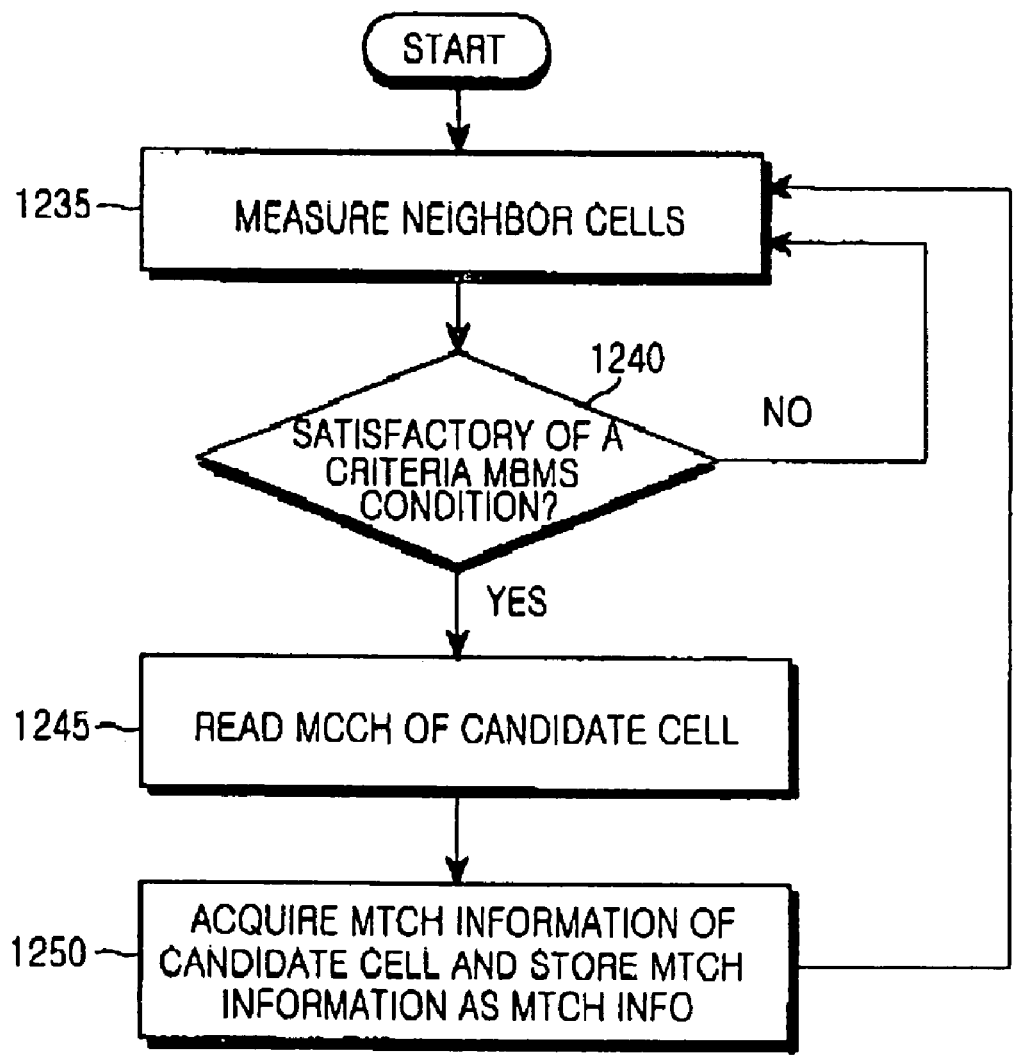
Figure 13C:
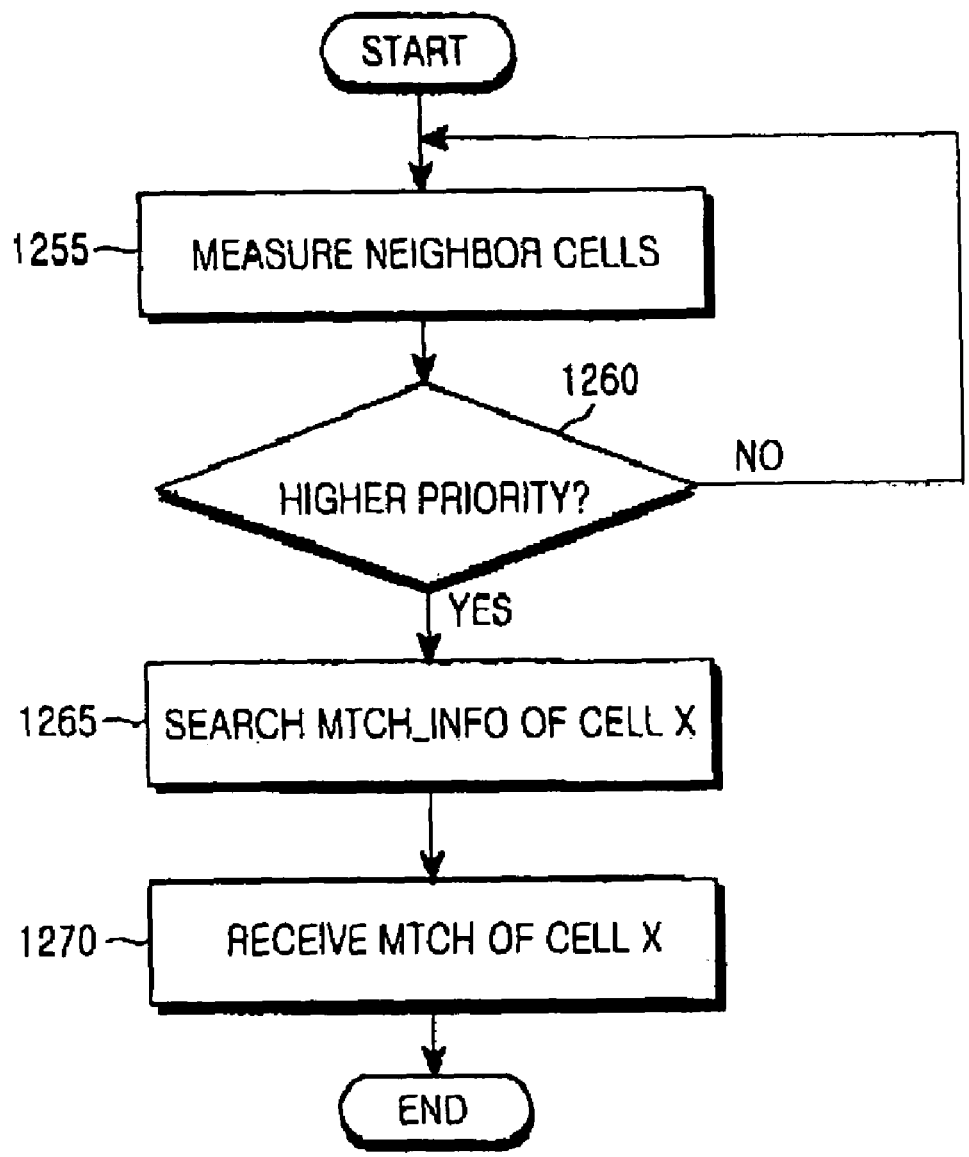

FIGS. 13A to 13C are flowcharts illustrating an operation of a UE according to the third embodiment of the present invention. First, an operation of acquiring MTCH configuration information of neighbor cells by a UE in a serving cell will be described with reference to FIG. 13A.

Referring to FIG. 13A, in step 1205, the UE receives an MBMS service over an MTCH from a serving cell. At the same time, in step 1210, the UE periodically receives control information for the MBMS service from the serving cell. That is, the UE receives SIB 3/4, SIB 5/6, SIB 11/12, and SIB_MCCH transmitted over a P-CCPCH of the serving cell. The SIB 3/4 includes criteria MBMS parameters designating cell reselection criteria for neighbor cells, and the SIB 11/12 includes information (cell ID and P-CPICH information) on neighbor cells, which become measurement objects. Information included in the SIB 3/4 and SIB 11/12 has already been described with reference to FIG. 7. In addition, the SIB_MCCH includes MCCH scheduling information shown by reference numeral 1105 illustrated in FIG. 12.

In step 1220, the UE receives MCCH data 1110 transmitted from the serving cell, using the SIB_MCCH 1105. The MCCH data 1110, as illustrated in FIG. 10, can be transmitted over a particular time period of S-CCPCH, and the particular time period is determined based on scheduling information of SIB_MCCH. In step 1225, the UE acquires MCCH configuration information MCCH_Neighbor info 1115 of neighbor cells, included in the MCCH data 1110. In step 1230, the UE stores the MCCH_Neighbor info 1115 and measurement information for the neighbor cells, acquired through the SIB 3/4 and SIB 11/12. The measurement information includes cell IDs of neighbor cells, a primary scrambling code of P-CPICH, RSCP and/or Ec/No of measurement objects, measurement parameters of Q_rxlevmin, Q_qualmin, Q_hyst, and Q_offset_s_n.

After the procedure of FIG. 13A is performed, an MCCH information acquisition operation illustrated in FIG. 13B or a target cell reselection operation illustrated in FIG. 13C can be selected by the UE.

Referring to FIG. 13B, in step 1235, the UE measures P-CPICHs from neighbor cells. Information on the neighbor cells is received through the SIB 11/12 of the serving cell, received in step 1210, and information on the measurement objects is received through the SIB 3/4 of the serving cell, received in step 1210. Parameters measured in step 1235 include Q_qualmeas or Ec/No, and Q_rxlevmeas or RSCP.

After measuring Q_qualmeas and Q_rxlevmeas for the neighbor cells, the UE determines in step 1240 whether one of the neighbor cells satisfies a criteria MBMS condition given through the SIB 3/4. The "criteria MBMS condition" is that the RSCP measurement value Q_rxlevmeas is larger than the minimum P-CPICH RSCP value Q_rxlevmin detected through the SIB 3/4, and the Ec/No measurement value Q_qualmeas is larger than the minimum P-CPICH Ec/No value Q_qualmin detected through the SIB 3/4.

If there are neighbor cells satisfying the condition that the RSCP measurement value Q_rxlevmeas is larger than the minimum RSCP value Q_rxlevmin and the Ec/No measurement value Q_qualmeas is larger than the minimum Ec/No value Q_qualmin, the UE identifies the neighbor cells satisfying the criteria MBMS condition as candidate cells, and then proceeds to step 1245. However, if there are no candidate cells, which satisfy the criteria MBMS condition, the UE returns to step 1235. In this case, the UE can use MBMS availability information of the neighbor cells included in the SIB 11/12 before being transmitted.

In step 1245, the UE receives MCCH data of candidate cells. In this case, the UE receives the MCCH data of candidate cells using MCCH configuration information of the candidate cells among MCCH_Neighbor info 1115 previously acquired in step 1225 so that the UE does not acquire MIB and SIBs on P-CCPCHs of the candidate cells determined in step 1240. The MCCH configuration information includes S-CCPCH information (FACH/PCH TFCS, FACH TFS, SF, and Code Number) of corresponding candidate cells, and MCCH scheduling information (MCCH_REP, MCCH_POS, and MCCH_COUNT) on the S-CCPCHs.

In step 1250, if MTCH control information for an MBMS service that the UE desires to receive exists in the MCCH data, the UE stores the MTCH control information as MTCH_INFO, and then returns to step 1235.

FIG. 13C is a flowchart illustrating a procedure for reselecting a particular target cell by a UE. The procedure illustrated in FIG. 13C is performed in parallel with or after the procedure of FIG. 13B.

Referring to FIG. 13C, in step 1255, the UE measures P-CPICHs from neighbor cells. The measurement in the step 1255 is substantially identical to the measurement in the step 1235. Preferably, the UE measures RSCP and Ec/No of P-CPICHs from the neighbor cells or the candidate cells identified in the step 1240.

In step 1260, the UE determines priorities of the candidate cells and a serving cell using the measurement values to determine whether a cell reselection procedure is detected. The priorities are determined by comparing R_n calculated for the candidate cells with R_s calculated for the serving cell. If R_n of a certain candidate cell X is higher than the R_s of the serving cell, the UE proceeds to step 1265, determining that the cell reselection is detected. If the R_s is higher than R_n of all candidate cells, the UE returns to step 1255. Here, a candidate cell having the highest R_n among the candidate cells having R_n that is higher than R_s of the serving cell is selected as a target cell.

In step 1265, the UE determines whether MTCH control information of the target cell is stored in MTCH_INFO. If the MTCH control information is stored in MTCH_INFO, the UE reconstructs in step 1270 a receiver using the MTCH control information and starts receiving an MBMS service data stream transmitted over MTCH of the target cell.

As can be understood from the foregoing description, the present invention supports an efficient MBMS service by supporting mobility of a UE receiving an MBMS service. In addition, the UE previously stores control information for an MBMS service supported in a target cell before performing cell reselection from a serving cell to the target cell, thereby seamlessly providing the MBMS service.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A cell reselection method by a user equipment (UE) receiving a Multimedia Broadcast/Multicast Service (MBMS) service in a serving cell of a mobile communication system including a plurality of cells and providing the MBMS service, the method comprising the steps of:

receiving a control data of the serving cell, including configuration information necessary for accessing MBMS control channels (MCCHs) of neighbor cells and control information necessary for accessing an MBMS data transport channel (MTCH) of the serving cell, over an MCCH of the serving cell, and storing the received control data; and if cell reselection to a target cell, which is one of the neighbor cells, is determined, moving to the target cell by utilizing the configuration information stored for the target cell.

2. The cell reselection method of claim 1, wherein the configuration information includes a primary scrambling code, a transport format, a spreading factor (SF), and a code number for each code channel to which the MCCHs of the neighbor cells are mapped.

3. The cell reselection method of claim 2, wherein the configuration information further includes scheduling information for the MCCHs of the neighbor cells.

4. The cell reselection method of claim 3, wherein the scheduling information includes a transmission period, a transmission time, and a data length for one period, for control information on a code channel to which a corresponding MCCH is mapped.

5. The cell reselection method of claim 1, wherein the control information includes a spreading factor, a code number, and a transport format set (TFS) of a code channel to which the MTCH of the serving cell is mapped.

6. The cell reselection method of claim 5, wherein the control information further includes a service identifier for each MBMS service provided in the serving cell, packet data convergence protocol (PDCP) information formed for an MBMS stream, and radio link control (RLC) information for the MBMS stream.

7. The cell reselection method of claim 1, wherein the step of receiving the control data comprises the steps of:

receiving, in the serving cell, system information including scheduling information of the control data; and
receiving the control data according to the scheduling information.

8. The cell reselection method of claim 7, wherein the scheduling information includes a transmission period, a transmission time, and a data length for one period, for the control data on a code channel to which the MCCH of the serving cell is mapped.

9. The cell reselection method of claim 1, wherein the step of receiving the control data comprises the steps of:
receiving, in the serving cell, first system information including scheduling information of the control data;
receiving second system information including a spreading factor, a code number, and a transport format set (TES) of a code channel to which the MCCH of the serving cell is mapped; and
receiving the control data using the first and second system information.

10. The cell reselection method of claim 9, wherein the scheduling information includes a transmission period, a transmission time, and a data length for one period, for the control data on a code channel to which the MCCH of the serving cell is mapped.

11. The cell reselection method of claim 1, further comprising the steps of:
measuring qualities of signals from the serving cell and the neighbor cells;
designating the neighbor cells satisfying a service criterion provided from the serving cell as candidate cells;
receiving control information necessary for accessing MTCHs of the candidate cells, over MCCHs of the candidate cells, using configuration information stored for the candidate cells;
storing the received control information;
determining priorities of the serving cell and the candidate cells;
if there is at least one candidate cell having a priority that is higher than the priority of the serving cell, selecting the at least one candidate cell having a highest priority as a target cell; and
receiving an MBMS data stream over an MTCH of the target cell using control information stored for the target cell.

12. The cell reselection method of claim 11, wherein the signal qualities include a received signal code power (RSCP) and a chip-energy-to-noise ratio Ec/No for common pilot channels (CPICHs) of the neighbor cells.

13. The cell reselection method of claim 12, wherein the service criterion is satisfied when the measured RSCP is larger than a first minimum value provided from the serving cell and the measured Ec/No is larger than a second minimum value provided from the serving cell.

14. The cell reselection method of claim 11, wherein the step of determining the priorities comprises the steps of:
calculating the priority of the serving cell by adding one of an RSCP and an Ec/No measured for the serving cell to a weight previously given for the serving cell; and
calculating the priorities of the candidate cells by subtracting a weight previously given for each of the candidate cells from one of an RSCP and an Ec/No measured for each of the candidate cells.

15. A method for providing a Multimedia Broadcast/Multicast Service (MBMS) service to a user equipment (UE) moving between a plurality of cells in a mobile communication system providing the MBMS service, the method comprising the steps of:

transmitting system information including information on a secondary common control channel for an MBMS service of a serving cell over a primary common control channel of the serving cell; and
transmitting a control data including configuration information necessary for accessing MBMS control channels (MCCHs) of neighbor cells and control information necessary for accessing an MBMS data transport channel (MTCH) of the serving cell, over the secondary common control channel of the serving cell, while providing the MBMS service over the MTCH of the serving cell.

16. The method of claim 15, wherein the system information includes first system information including scheduling information of the control data, and second system information including a spreading factor, a code number, and a transport format set (TFS) of a code channel over which the control data is transmitted.

17. The method of claim 15, wherein the configuration information includes a primary scrambling code, a transport format, a spreading factor (SF), and a code number of each code channel to which the MCCHs of the neighbor cells are mapped.

18. The method of claim 17, wherein the configuration information further includes scheduling information for the MCCHs of the neighbor cells.

19. The method of claim 18, wherein the scheduling information includes a transmission period, a transmission time, and a data length for one period, for the control information on a code channel to which a corresponding MCCH is mapped.

20. The method of claim 15, wherein the control information includes a spreading factor and a code number of a code channel to which the MTCH of the serving cell is mapped.

21. The method of claim 20, wherein the control information further includes a service identifier for each MBMS service provided in the serving cell, packet data convergence protocol (PDCP) information for an MBMS stream, radio link control (RLC) information for the MBMS stream, and a transport format set (TFS) of the MBMS stream.

22. A cell reselection method by a user equipment (UB) receiving a Multimedia BroadcastMulticast Service (MBMS) service in a serving cell in a mobile communication system including a plurality of cells and providing the MBMS service, the method comprising the steps of:
if candidate cells for cell reselection are identified while an MBMS service is provided in the serving cell, receiving first system information of the candidate cells including scheduling information necessary for accessing MBMS control channels (MCCHs) of the candidate cells, and second system information of the candidate cells related to a code channel to which the MCCHs of the candidate channels are mapped;
receiving control information necessary for accessing MBMS data transport channels (MTCHs) of the candidate cells over the MCCHs of the candidate channels, using the first and second system information;
storing the received control information; and
if cell reselection to a target cell, which is one of the candidate cells, is determined, moving to the target cell by utilizing the control information stored for the target cell.

23. The cell reselection method of claim 22, wherein the scheduling information includes a transmission period, a transmission time, and a data length for one period, for the control information on a code channel to which the MCCH of the corresponding candidate cell is mapped.

24. The cell reselection method of claim 22, wherein the second system information includes a spreading factor, a code number, and a transport format set (TFS) of a code channel to which the MCCH of a corresponding candidate cell is mapped.

25. The cell reselection method of claim 22, wherein the control information includes a spreading factor, a code number, and a transport format set (TFS) for a code channel to which the MTCH of a corresponding candidate cell is mapped, a service identifier for each MBMS service provided in a corresponding candidate cell, packet data convergence protocol (PDCP) information for an MBMS stream, and radio link control (RLC) information for the MBMS stream.

26. A method for providing a Multimedia Broadcast/Multicast Service (MBMS) service to user equipments (UEs) moving between including a plurality of cells in a mobile communication system providing the MBMS service, the method comprising the steps of:
  transmitting, in a cell providing the MBMS service, first system information including scheduling information necessary for accessing an MBMS control channel (MCCH) of the cell and second system information related to a code channel to which the MCCH of the cell is mapped; and
  transmitting control information necessary for accessing an MBMS data transport channel (MTCH) of the cell over the MCCH of the cell.

27. The method of claim 26, wherein the scheduling information includes a transmission period, a transmission time, and a data length for one period, for control information on a code channel to which the MCCH of the cell is mapped.

28. The method of claim 26, wherein the second system information includes a spreading factor, a code number, and a transport format set (TFS) for a code channel to which the MCCH of the cell is mapped.

29. The method of claim 26, wherein the control information includes a spreading factor, a code number, and a transport format set (TFS) of a code channel to which the MCCH of the cell is mapped, a service identifier for each MBMS service provided in the cell, packet data convergence protocol (PDCP) information for an MBMS stream, and radio link control (RLC) information for the MBMS stream.

* * * * *